United States Patent [19]
Quinn et al.

[11] 3,762,907
[45] Oct. 2, 1973

[54] GLASS FORMING MACHINE HAVING AN AUTOMATIC CONTROL SYSTEM

[75] Inventors: Richard M. Quinn; Jerome A. Kwiatkowski, both of Muncie, Ind.

[73] Assignee: Ball Corporation, Muncie, Ind.

[22] Filed: Feb. 22, 1971

[21] Appl. No.: 117,586

[52] U.S. Cl............... 65/164, 65/163, 65/DIG. 13, 235/151.1, 235/92 EA
[51] Int. Cl............................................. C03b 7/00
[58] Field of Search............... 65/163, 164, DIG. 13, 65/29, 165; 235/151.1, 92 EA, 92 PD

[56] References Cited
UNITED STATES PATENTS

| | | | |
|---|---|---|---|
| 3,305,341 | 2/1967 | Mumford | 65/164 X |
| 3,471,278 | 10/1969 | Griem, Jr. | 65/163 X |
| 3,531,629 | 9/1970 | Quinn | 235/92 |

Primary Examiner—Arthur D. Kellogg
Attorney—Gilbert E. Alberding O'Rourke

[57] ABSTRACT

A glass forming machine having an electronic control system for effecting automatic synchronous operation of the various sections thereof, all of which are fed by a common gob feeding means to thereby automatically and continuously form hollow glass articles.

30 Claims, 28 Drawing Figures

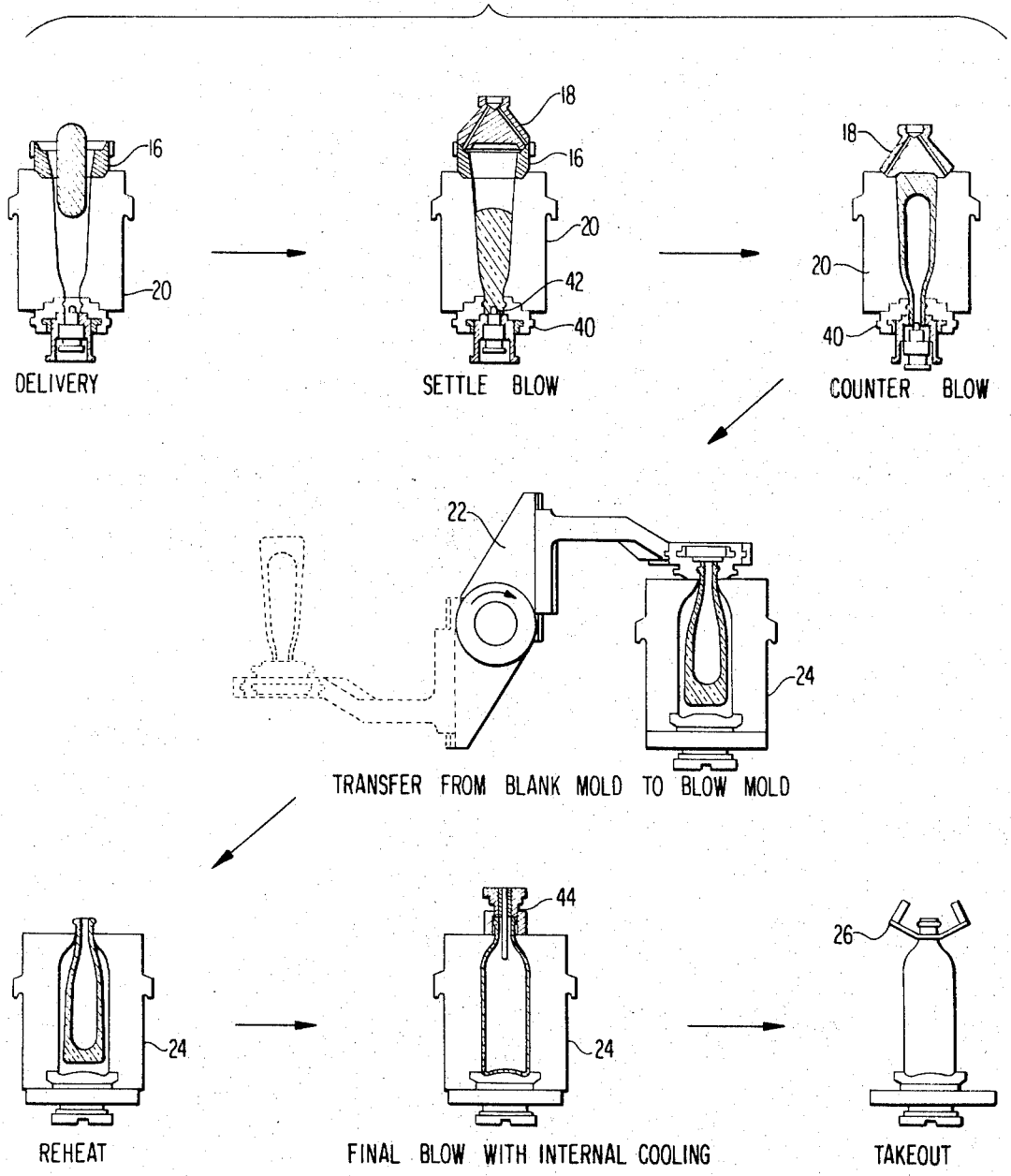

3,762,907

GLASS FORMING MACHINE HAVING AN AUTOMATIC CONTROL SYSTEM

BACKGROUND OF THE INVENTION

1. Field of the Invention

This invention pertains generally to machines for forming hollow glass articles from molten glass, and more particularly to an electronically controlled glass forming machine.

2. Discussion of Prior Art

The formation of hollow glass articles from a supply of molten glass is an ancient art. In modern times, it has become customary to form glassware by machine, in contrast to the slower and less efficient process of forming such articles by hand. The development of such machines made possible the mass production of glass articles, especially as improvements in and modifications of such mechanized systems were realized.

The individual section, or IS glass forming machine which is well known in the art, has a plurality of glass forming means integrated into a single plural-section machine fed by a single source of molten glass. The sections are operated in synchronism in such relative phase relationship as to permit the several sections to acquire gobs in ordered sequence from the single associated gob feeding means. Thus, as one of the sections is taking a gob from the feeding means, another section is delivering a finished article to an output conveyor, and other sections are engaged in various forming steps intermediate the taking of a gob and the production of finished ware.

Further, it has been customary to provide two molds, rather than one, in each section of an individual section machine, whereby a gob is received in a first mold, called the blank or parison mold, for the initial process of forming a parison, followed by transfer of the parison to a second mold, called the blow mold, for final blowing of the article. By this means, each section of the machine is operating simultaneously upon two workpieces.

The several elements of the glass forming stations in the individual section machine are usually driven by pneumatic pressure, which, heretofore, has been under the control of a mechanical synchronizing means in the form of rotary drums or the like provided with adjustably positioned cam members around the cylindrical periphery thereof for mechanically operating a plurality of pneumatic valves in a predetermined sequence. As the timing drum associated with a given section rotates, the several pneumatically operated forming means, including the aforementioned blank and blow molds and the elements associated therewith, are mechanically activated in the required sequence (as determined by the relative positioning of the cam members on the surface of the drum) in response to the application of fluid pressure thereto under the control of respective valves which are opened and closed by the cams. The timing drums are drived in synchronism with the gob feeding means and the means for conveying finished articles, resulting in a continuing flow of molten glass into the machine and a corresponding flow of ware down the conveyor.

The individual section machine, in spite of the many advantages attendant thereto, is not without its limitations. One such limitation, which is characteristic of this general type of machine is the cumbersome means provided for adjusting the timing of the operation of the several valves which, in turn, determine the time of operation of the elements of the forming means. As was previously described, the timing of the operation of the pneumatic valves is governed by the positioning of cam members on the cylindrical periphery of the timing drums. These cam members are generally mounted in annular grooves in the drum surface, and are adapted to be adjustably positioned in their respective axially spaced grooves at points on the drum surface which coincide with the position of respective valve operating members at the times at which such valves are to be operated. Once positioned, a cam is secured in that position by the tightening of a nut or the like, clamping the cam in place.

Not only is the process of positioning the cams on a timing drum an inexact procedure at best, with the drum stationary, but it becomes a time-consuming and painstaking task to locate and secure the cams with any degree of accuracy when the drum is rotating. While the adjustment of the cams can be performed with the drums stationary at the start of a run, it is generally undesirable to stop a machine during a run to permit adjustment of the cam, since, as is well known in the art, glass machines desirably achieve and maintain a thermal balance upon continued operation, such thermal equilibrium affording an enhanced uniformity in the ware produced.

Further, even where an operator succeeds in loosening the nut, repositioning the cam as accurately as possible and retightening the nut, all with the drum rotating, the continued use of the forming machine eventually results in mechanical wear of the cam surface and the cooperating surface of the respective valve operator. Such wear has been known to delay the operation of the valves to a significant degree, resulting in irregularities in the forming operation and resultant unacceptable ware. Also, the worn cam surface will eventually fail to urge the valve operator through its full travel, resulting in less than complete opening of the valve, corresponding malfunction of the related machine part and resultant damage to the work.

SUMMARY OF THE INVENTION

Accordingly, it is an object of the present invention to provide an improved glassware forming machine including an electronic timing and synchronizing control system.

Another object of the invention is to provide an improved glass forming machine in which the sequence of events constituting the various steps of ware formation is controlled and maintained with a degree of accuracy heretofore unobtainable.

Still another object of the present invention is to provide an improved glass forming machine wherein the modification of the sequence of events constituting the steps of ware formation is greatly facilitated.

Yet another object of this invention is to provide novel circuitry and/or other components useful in said improved glass forming machine.

In accordance with the present invention, these and other objects are achieved generally by means of a glass forming machine including means for feeding successive gobs of molten glass at a uniform rate, a plurality of glassware forming means each constituting an individual section of such machine for repetitively performing a sequence of steps in the formation of hollow glassware articles from gobs taken from such feeding means, electronic control means for each of such glassware forming means for automatically controlling the order and duration of the several steps performed by the respective forming means and electronic control means common to all of such forming means for automatically controlling the operation of such individual electronic control means in timed relationship with each other and with such gob feeding means.

BRIEF DESCRIPTION OF THE DRAWINGS

With the above considerations and objects in mind, the invention itself will now be described in connection with a preferred embodiment thereof, given by way of example and not of limitation, and with reference to the accompanying drawings, in which:

FIG. 2 is a schematic representation of the sequence of events occurring in one section of a typical individual section machine;

DETAILED DESCRIPTION

Figure 1A:
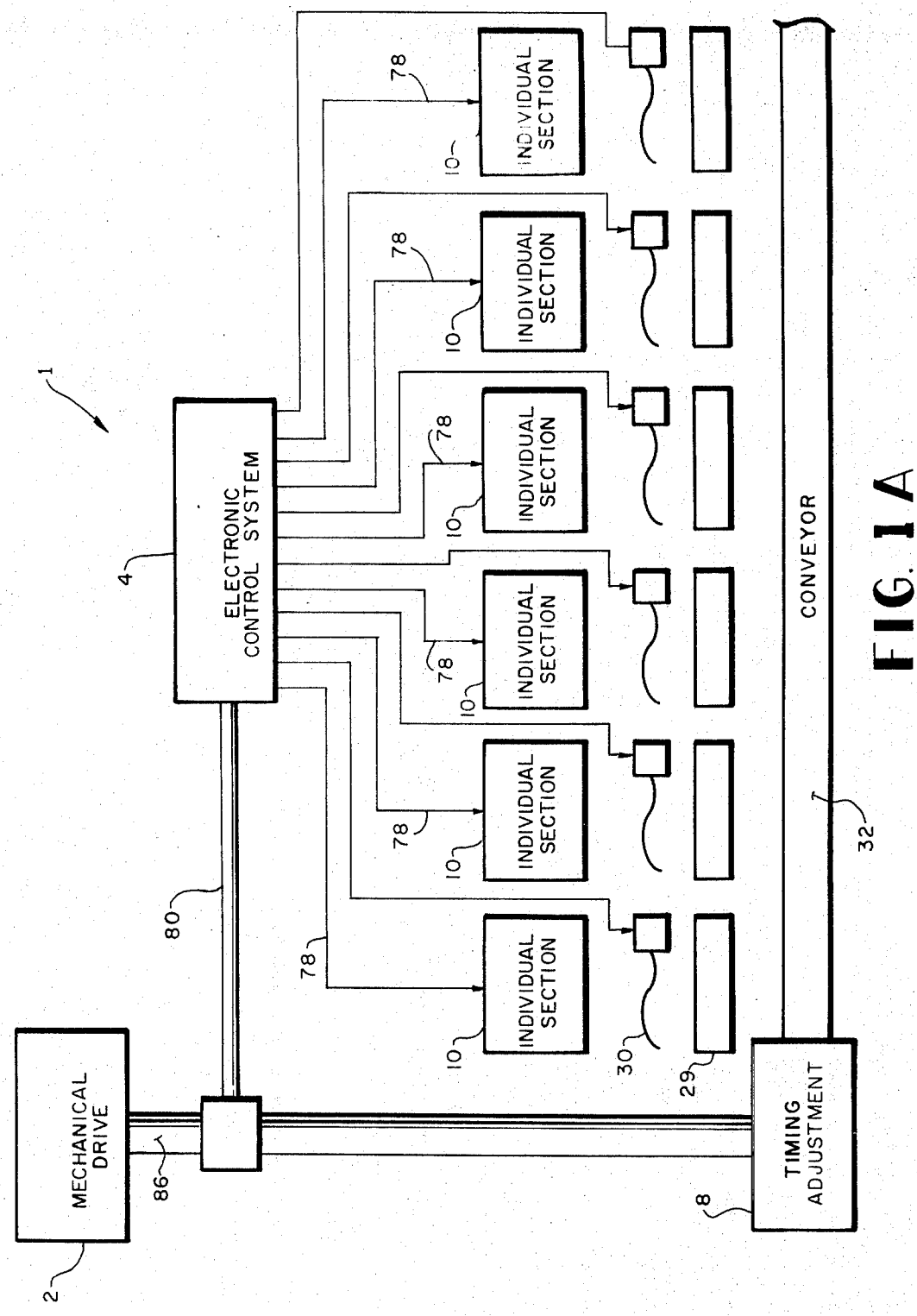
FIG. 1A is a block schematic diagram of a glass forming machine having a plurality of forming sections controlled by a centralized electronic control system assembly.

Referring now to the drawings, wherein like components are designated by like reference numerals throughout the various figures, a glass forming machine 1, constructed in accordance with the present invention is functionally illustrated in FIG. 1A and includes a plurality of identical sections 10 (six as shown by way of example in FIG. 1A), one of which is to be disclosed in detail hereinafter.

As indicated in FIG. 1A, a conveyor belt 32 is normally associated with a glass forming machine to carry ware from the machine after fromation. Commonly, such a conveyor is mechanically driven by conveyor mechanism drive 2 through a rotatable shaft 86 and a timing adjustment mechanism 8, all of which may be conventional. In the apparatus of this invention, this drive system may be utilized by electronic control system 4 to achieve overall operational coordination by having the electronic control system sense rotation of drive shaft 86 and then utilizing this information for timing within the system, this being more particularly achieved by use of pulse generators within the system.

As will be brought out more fully hereinafter, the electronic control system controls operation of all of the individual sections of the glass forming machine by timewise coordinating this system with the mechanical drive associated equipment, such as, for example, conveyor 32, to thereby achieve overall operational timing. By way of further example of mechanical control, pusher arms 30, which are indicated in FIG. 1A as being controlled by electronic control system 4 to move ware from dead plate 29 to conveyor 32, could also be mechanically controlled by connection with timing adjustment mechanism 8 if desired.

Thus, as is functionally shown in FIG. 1A the electronic control system 4 is coordinated to overall operational timing so that the production of ware will be coordinated in the entire manufacturing process. As will be brought out more fully hereinafter, this control includes not only control of shearing of glass gobs to be delivered to the glass forming machine, but also controls each step of forming the ware and then transferring the formed ware for subsequent processing. It is to be appreciated, however, that, if desired, the overall operational timing could be controlled by electronic control system 4, such as, for example, by having system 4 control the mechanical timing portions such as control of rotation of shaft 86, without departing from the intended scope of this invention.

Figure 1B:
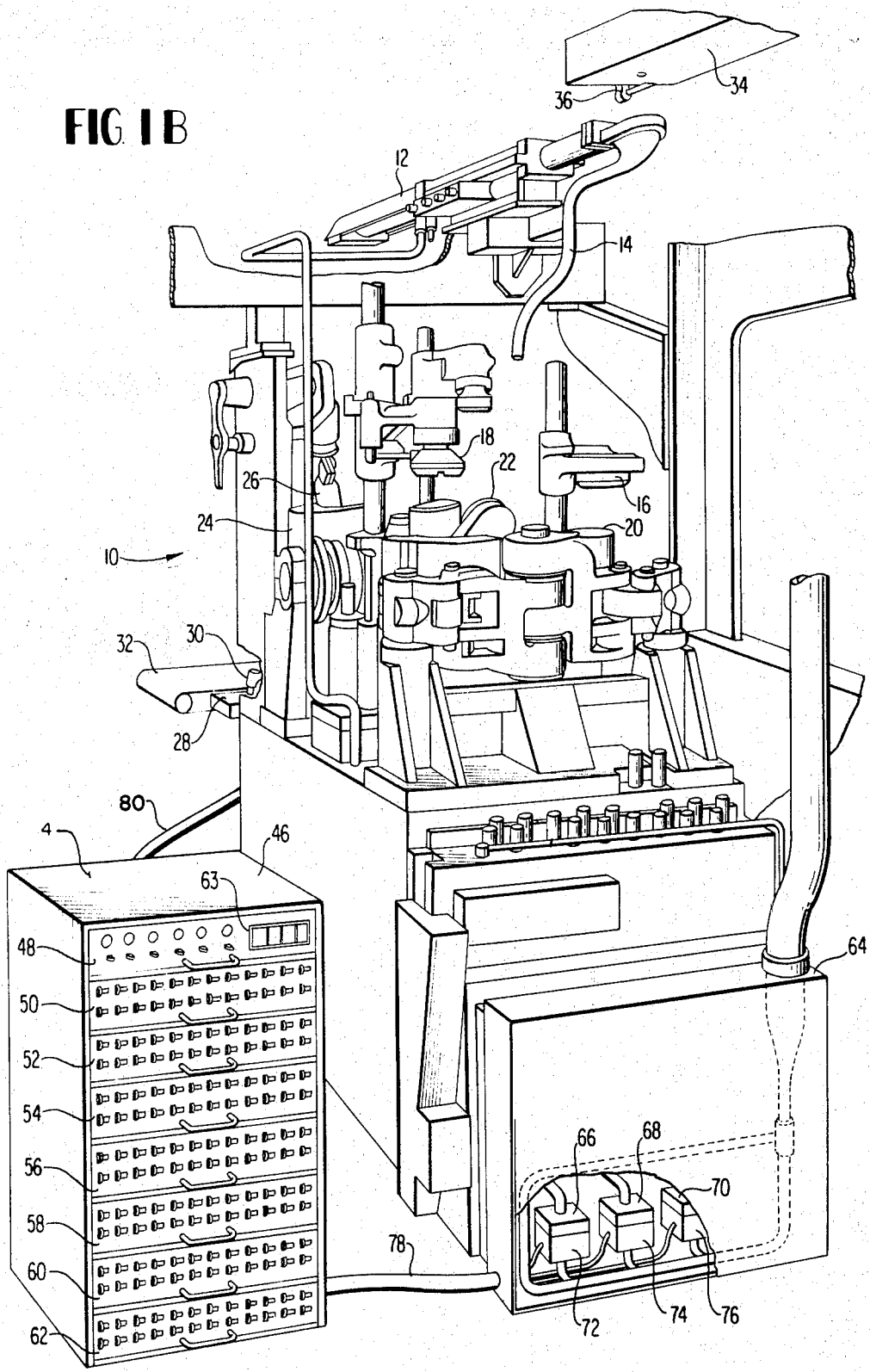
FIG. 1B is a perspective view, with portions being broken away for clarity, of one section of the glass forming machine illustrated in block form in FIG. 1A, and including the electronic control system assembly as a whole.

Referring now specifically to FIG. 1B, an individual section of an exemplary glass forming machine of the individual section type is shown in perspective, with portions broken away for clarity. It is to be understood that the glass forming machine as shown, however, is merely representative of the type of machine to which the present invention is applicable, since the particular details of the forming machine and the control system adapted thereto may be varied to suit the needs of a given installation. For example, the glassware forming machine to which reference is made herein is known as a blow-and-blow machine, whereas the invention is equally applicable to a press-and-blow machine.

Glass forming machines, generally, and individual section machines, in particular, are well known to those skilled in the art, and no detailed description of the structure or operation thereof is necessary in a disclosure of the present invention. However, irrespective of the particular type of glass forming machine contemplated, certain basic elements are present, and a brief description of such elements, their operation and their relationship to a few of the elements peculiar to the blow-and-blow machine is in order to gain a clearer perspective of the invention.

As illustrated in FIG. 1B, one of the sections 10 of a blow-and-blow machine is shown from the back side or blank mold side, displaying such elements as scoop 12, delivery means 14 and both funnel 16 and baffle 18 associated with blank mold 20. A transfer or invert mechanism 22 is positioned intermediate the front and back sides of the machine, for inverting the parison formed in the blank mold 20 while transferring it to a blow mold 24 at the front of the section. A suitable takeout mechanism 26 is positioned near blow mold 24 for removal of the hot finished ware therefrom and transferred to a corresponding dead plate 28. Also, on the front side of the machine is pushout mechanism or pusher arm 30 for delivering the ware from the dead plate 28 to conveyor means 32, which, as stated above, will normally serve to transport the ware for further processing, as, for example, to a suitable lehr (not shown) for annealing and subsequent cooling and any other desired treatment (such as a lubricant coating).

It will be understood, as stated above, that the machine thus illustrated in FIG. 1B is but one section of a plural-section machine. In the embodiment of the invention to be described herein, the overall machine will comprise six sections, as illustrated in FIG. 1A, each being fed a gob of molten glass in ordered sequence from single-feeding means 34 which constitutes a portion of a suitable source of molten glass, such source usually including means for weighing and mixing the several dry ingredients and means for delivering batches of such mix to a furnace, in which the mix is converted to a molten mass and maintained at a desired temperature for delivery to a feeding means, such as feeding means 32. The continuous flow of molten glass from feeding means 34 is interrupted by a shear means 36, which cuts the molten glass into individual gobs for delivery to the several sections of the machine in sequence, as will be further described herein.

It is customary to employ pneumatic pressure as the motive force for actuating each of the plurality of moving elements of the individual section machine, and the control system of the present invention, being well suited to pneumatic actuation, will be described as a means for actuating a plurality of pneumatic valves in a desired sequence for applying pneumatic pressure selectively to a corresponding plurality of pneumatic actuators (such as piston-cylinder assemblies) which serve as the respective motive means for the several moving elements of the machine.

Such machine elements have been shown, at least generally, in connection with the description of FIGS. 1A and 1B, but the interrelated operation thereof will be more fully appreciated and understood in connection with a combined description of FIGS. 1A, 1B and 2, the latter showing schematically the sequence of events in one section of a blow-and-blow machine.

First, the continuous flow of molten glass from the feeder 34 is repetitively severed at a predetermined rate by means of shears 36, separating the flow into a series of gobs. As each section of the machine acquires a gob in sequence, the gob falls from the shears 36 and is carried by the delivery means 14 (including a scoop, trough and deflector) to the blank mold 20, over which the funnel 16 is positioned in order to guide the gob into the mold. Thus, as is indicated in the first step in the sequence illustrated in FIG. 2, the gob falls through funnel 16 into the interior of the mold. As a second step, the baffle 18 is positioned over the funnel 16, and air discharged into the mold through baffle 18 forces the molten glass into the neckring 40 and around the plunger 42, in a step referred to as settle-blow. The third step set forth in FIG. 2 shows the funnel 16 removed and baffle 18 in place on top of the blank mold, with plunger 42 retracted. Counterblow air now is introduced into the depression left in the glass by the plunger, causing the glass to fill the blank, forming a parison.

During this counterblow step, the third step in FIG. 2, the body of the blank mold extracts heat from the parison sufficiently to form a cooled skin thereon which is sufficiently rigid to permit manipulation of the parison by a transfer mechanism which carries the parison to the blow mold 24 on the front side of the machine. This transfer of the parison from blank to blow molds is illustrated as the fourth step in FIG. 2, wherein the pivotal transfer mechanism 22 removes the parison from between the opened halves of the split blank mold and places it between the closing halves of the blow mold, having inverted the parison in the process, so that it is now in an upright position, with the mouth at the top, and supported by the neckring 40.

Subsequent to the invert step, the neckring halves are separated, so that the parison is left hanging by the now-closed halves of the blow mold. In this position, the reheat step takes place, in which the cooler skin of the glass is reheated by the relatively hot interior glass, and the parison then becomes sufficiently soft for final blowing.

In the final blowing, indicated in step 6 of FIG. 2, blowhead 44 is positioned over the blow mold 24, and blow air is forced into the soft parison, causing it to fill the blow mold and take the shape thereof, the shape of the desired finished ware. Here, again, heat is absorbed by the mold walls, cooling the glass to render it sufficiently stiff for handling.

In the last step shown in FIG. 2, the split halves of the blow mold have parted, and the tongs of the takeout mechanism 26 grip the ware at the neck and transfer it to the dead plate, for further cooling and pushout to the conveyor.

As is obvious, the timing of the movements of all of the foregoing glass forming elements is critical, and each element must be moved with precision not only to enable it to perform its function in the overall process, but to prevent collisions between elements, whereby one faulty element would prevent other elements from performing their tasks. For example, if the scoop for a given section fails to retract in time from a position under the shears, the scoops of other sections will be jammed in attempting to acquire gobs. If the blank mold fails to open properly, the next gob will fall on top of the blank. If the funnel is not positioned over the blank at the proper time, the gob might fail to enter the blank. Should the baffle fail to come down as needed, the parison would be misformed. If either the funnel or the baffle failed to leave the top of the blank after parison formation, the transfer arm would then collide with the faulty element on attempting invert. If the plunger fails to rise or retract as required, faulty parison formation follows. Should the transfer arm fail to revert, remaining in a position over the blow mold, the blowhead would be prevented from being seated atop the blow mold as required for final forming. Were the blowhead not to retract after final forming, a collision would occur with the takeout mechanism, as well as with the transfer arm on the next invert. Malformation of the ware results from failure of the blow mold to close and open properly, as well as from a failure of final blow. Should the takeout mechanism fail to retrieve a finished ware, the next subsequent parison will be jammed down on top of the previously finished piece. Where the neckring fails to open after invert, the parison will remain in the neckring and on revert will be placed back in the blow mold.

The foregoing tabulation of operating failures, tedious as it is, is only a partial listing of the faults that may occur in each section of an individual section machine, and a recital of even this partial list of faults serves to emphasize the necessity for accurate and reliable control of the operation of the machine. Accuracy of control is essential to the synchronous operation of the many elements within each section of the machine, as well as with respect to the timing of gob acquisition and finished ware delivery in the related control of the several sections. Reliability is equally essential in order to keep such elements moving in order to prevent extended shutdowns.

The control system of the present invention is inherently accurate and reliable to a degree neither achieved nor contemplated in the prior art. In accordance with the present invention, accuracy of movement of the many aforementioned elements of the machine is assured by electronic timing means, thus eliminating the relatively coarse determination of synchronous movement afforded by the mechanical timing means of the prior art. Similarly, reliability is assured by the utilization of advanced electronic techniques in the control system of the present invention, thus eliminating the gradual loss of control resulting from mechanical wear in the timing systems of the prior art. Further, the adjustment of the synchronous operation of the moving parts of the individual section machine of the present invention is greatly facilitated by such electronic control, whereby the timing of the operation of a function may be altered by the mere manipulation of a switch, as opposed to the somewhat cumbersome procedure of adjusting timing cams, as in the prior art. In addition, should a fault develop in the electronic control system of the present invention, the fault can be corrected by the mere replacement of a plug-in electronic module, such as a printed circuit board. Further, the electronic control system of the present invention provides not only an emergency stop means for each section of the machine, but a programmed stop means as well. In accordance with such programmed stop, the machine section will proceed automatically through a sequence of events required to place the several elements in a safe position and ready for access to the operator. Upon initiating a programmed start thereafter, the machine automatically performs the steps requisite to reattaining a normal interrelationship of the elements of the section prior to automatically acquiring a gob in synchronism with the other sections.

Referring once again to FIG. 1B, the electronic control system 14 of the present invention, as stated above, is housed in a cabinet 46, which is positioned at any convenient location, preferably in close proximity to the individual section machine. The physical arrangement within cabinet 46, in accordance with the preferred embodiment of the present invention, constitutes a plurality of slidable drawers each of which carries a related set of electronic modules and switches. The top drawer comprises master unit 48, which provides means for synchronizing the remaining units. The next six drawers, respectively, house identical control units 50 through 60 for the six sections of the individual section machine. The bottom drawer is a spare unit 62, identical to the several individual units 50 through 60.

Master unit 48 includes a readout means 63 providing an indication of the machine speed in shear cuts per minute, the least significant digit being a tenth of a shear cut, as will be further explained.

Each of the identical individual units 50 through 60 controls the operation of a respective section of the six-section machine. In the preferred embodiment, the front panel of each individual unit includes 48 three-decade thumb-wheel switches, the digits on each of which represent degrees of rotation of the machine. Each of the thumbwheel switches may be set to any number between 000 to 359, representing a complete cycle of the rotation of the machine, and thus the particular function controlled by an individual switch, as will be further explained, is controlled to an accuracy of 1° of such rotation.

For the particular section of the individual section machine shown in FIG. 1B, there is also shown a valve block 64, the cover of which is partially broken away to reveal valves 66, 68 and 70, three of the 19 solenoid-operated valves of the preferred embodiment. Valves 66, 68 and 70 are operated by respective solenoid actuators 72, 74 and 76, each of which is actuated, in turn, by associated circuitry in the master unit 48 and at the particular section unit there under which is in control of the machine section shown. The respective electrical circuits for achieving this control, interconnecting the console circuitry in cabinet 46 with the related solenoids for the valves in valve block 64, are routed, as stated above, through a steel conduit 78 or the like, similar conduits and enclosed cables leading from console cabinet 46 to the remaining five sections of the machine as illustrated in FIG. 1A. Further, the conduit 80 encloses circuitry leading from the machine as a whole to the master unit 48 in the console to provide the latter with a synchronizing signal reflecting the rotary position of the main machine drive as it repeats its cyclic operation, so as to synchronize the operation of the console circuitry, correspondingly to synchronize, in turn, the several sections. More specifically, a timing pulse generator located on the drive shaft of the machine generates one pulse for every degree of rotation, while a reset generator also mounted on the drive shaft generates one pulse for every 360° of rotation thereof, as will be further explained herein.

Figure 3A:
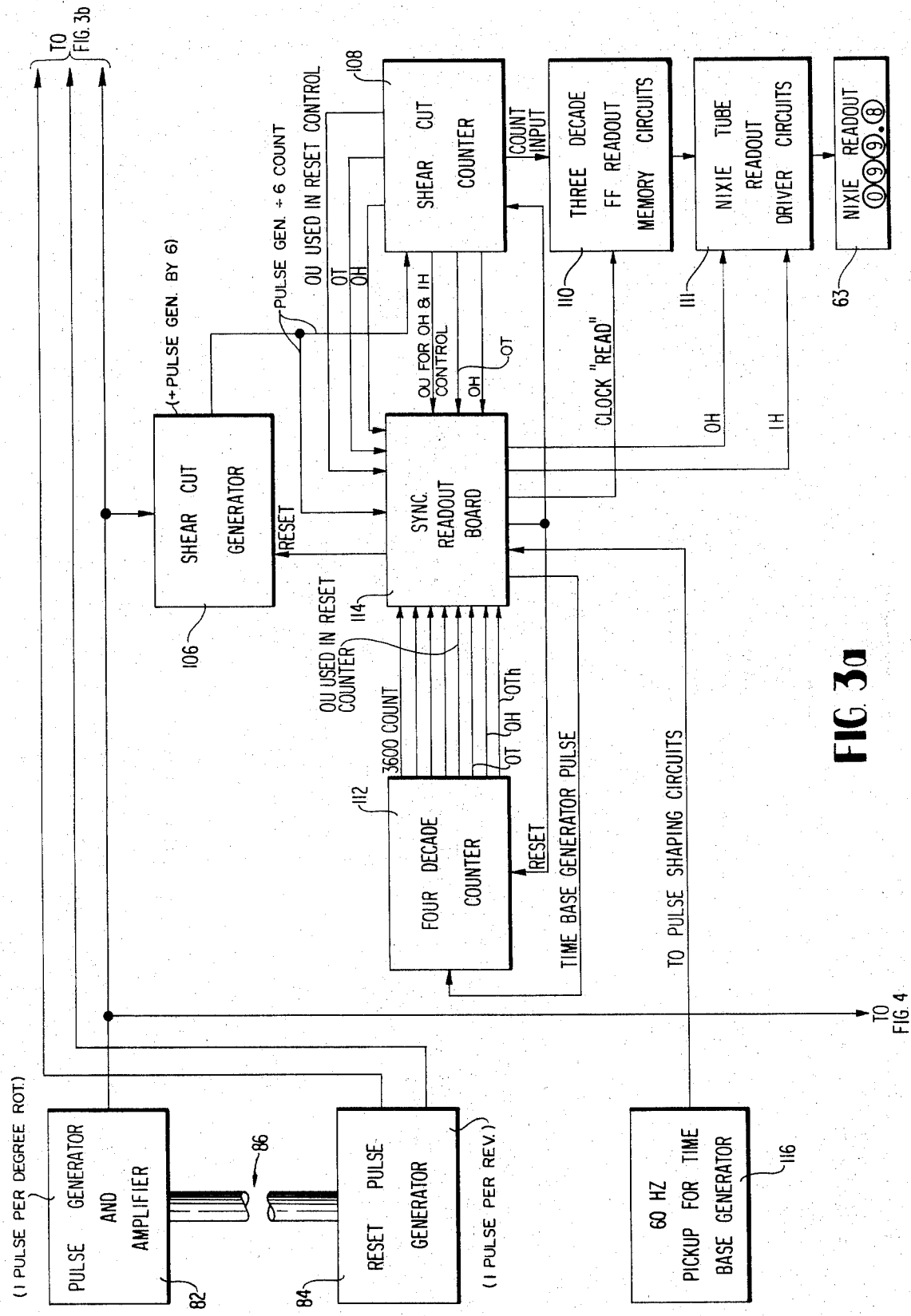
FIG. 3 is a block diagram of the master control unit of the present invention.
Figure 3B:
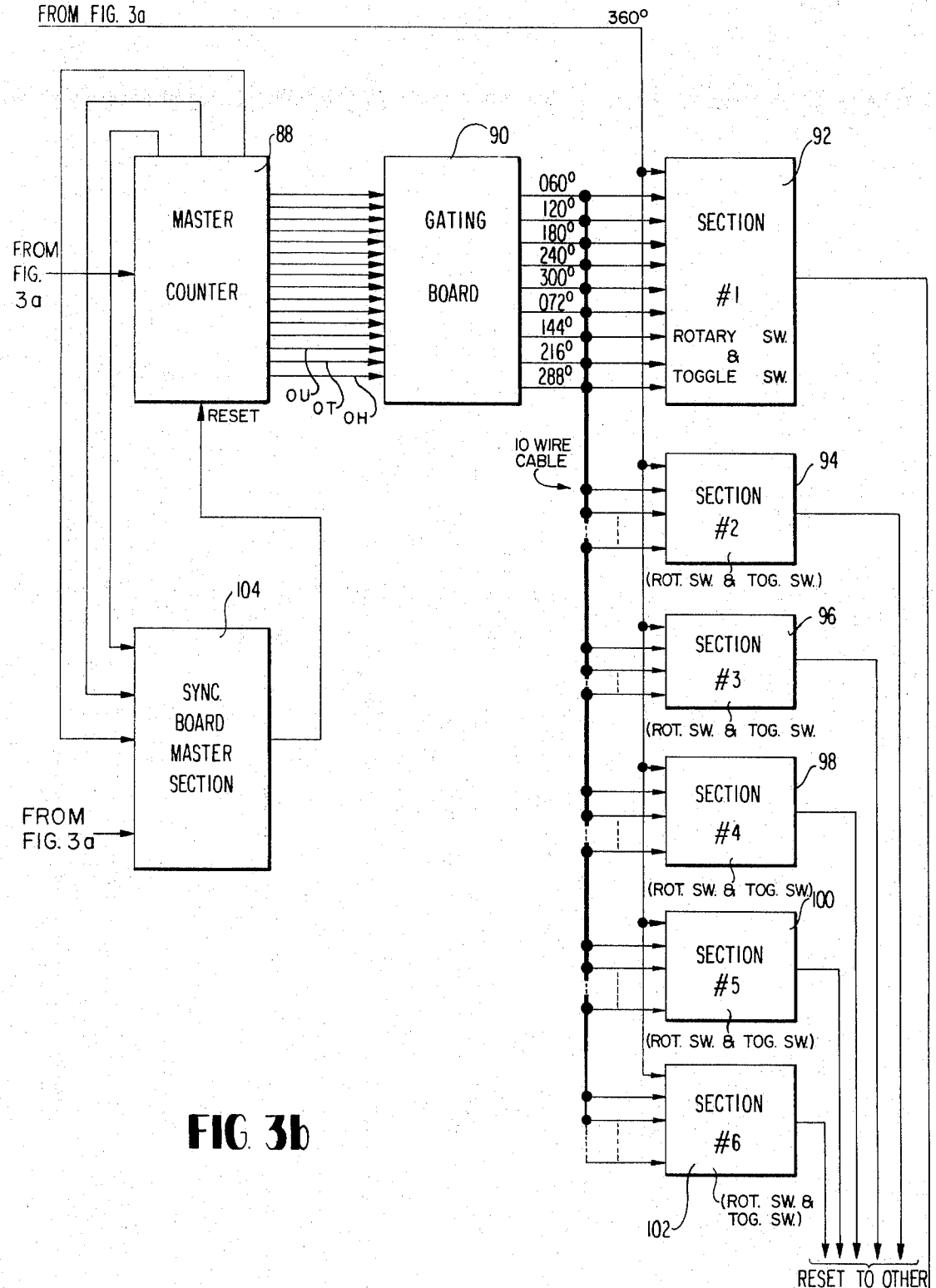
Figure 4:
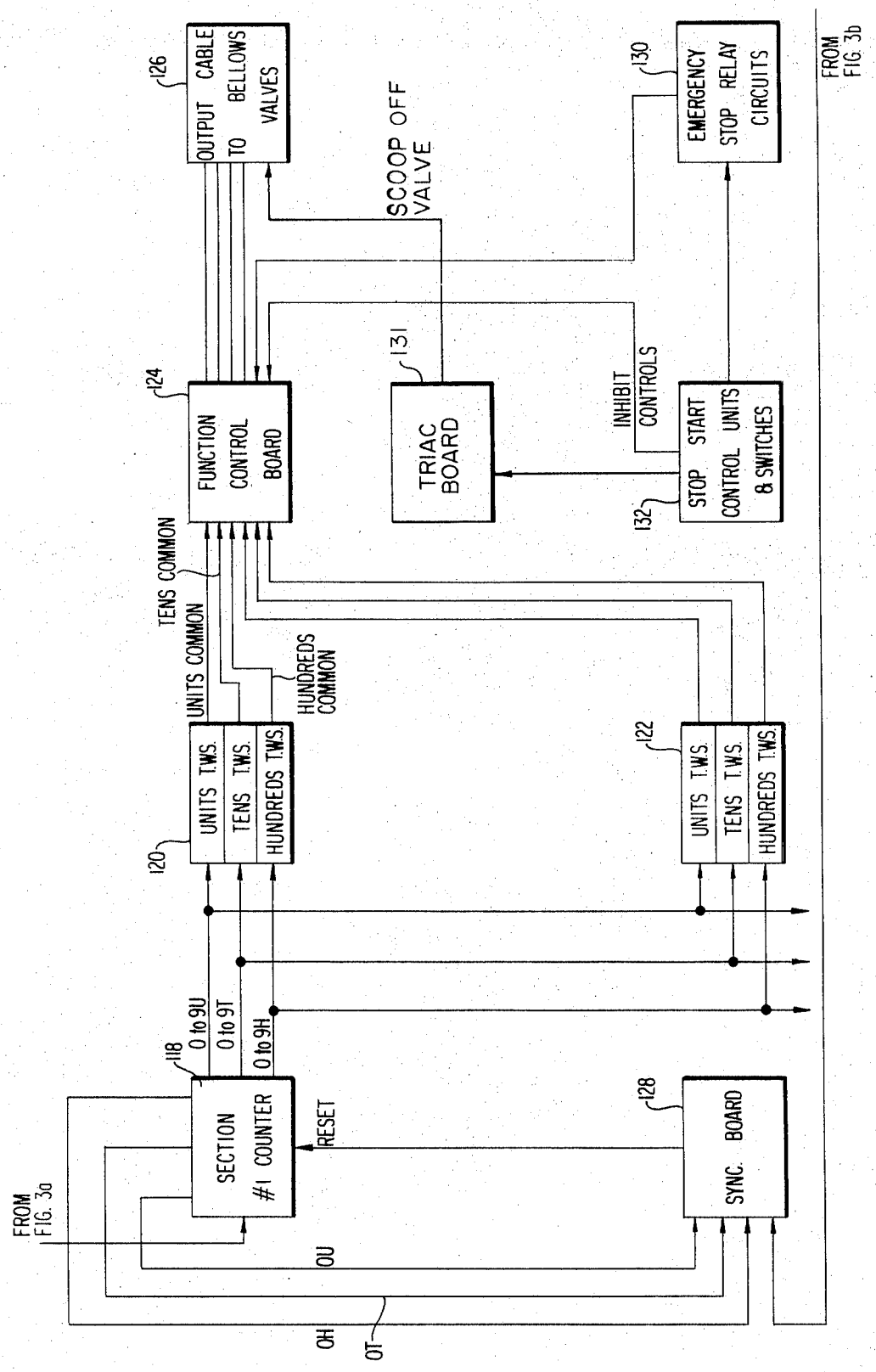
FIG. 4 is a block diagram of an individual section control unit of the present invention, representative of each of the several individual control units employed.

A better understanding of the electronic timing and control system of the preferred embodiment of the present invention may be had by reference to the block diagrams of FIGS. 3 and 4, the former constituting a block diagram of master unit 48 in console cabinet 46, and the latter illustrating the circuitry in each of the individual units 50 through 62 therein. Master unit 48 generates synchronizing reset pulses for the six active individual units 50 through 60, along with signals for driving the readout means 63. Master unit 48 includes a 15 volt direct current supply and a 170-volt direct current supply, the latter being employed to energize a four digit readout means 63. Master unit 48 also includes six rotary switches and six single pole double throw-switches, which twelve switches constitute the firing order controls for the six sections of the machine. Also, master unit 48 includes a rack for a plurality of cards or printed circuit boards, including eleven counter cards, one synchronizing card, one gating card, one synchronizing readout card, three memory cards, one voltage regulator card and one pulse amplifier card.

Referring now particularly to the details of the block diagram of the master unit 48 in FIG. 3, it will be seen that the two pulse generators to which reference has been made are shown as being a portion of the circuitry of master unit 48, constituting blocks 82 and 84 therein. In reality, the pulse generating means will preferably be external to master unit 48, constituting a suitable conventional means mounted on the drive shaft of the machine, such drive shaft being indicated schematically at 86 in FIG. 3. The pulse output from pulse generator 82 is first amplified by a power amplifier forming a portion of the circuitry in block 82 in FIG. 3. This amplified output is then connected through master counter 88 to gating board 90, the several outputs of which constitute selected counts of master counter 88 to serve as inputs to the six firing order control switches 92 through 102. The outputs of these six firing order control switches 92 through 102 are connected to appropriate circuitry in the respective individual units 50 through 60, serving as reset signals to the counters in the individual units in order to synchronize the operation of the individual units (and their respective machine sections) in accordance with the firing order selected by the manipulation of the six switches 92 through 102.

One output of the reset pulse generator 84 is applied to master unit sync board 104, the output of which is connected as a reset to master counter 88. Master sync board 104 ensures that all three decades of master counter 88 are reset when required. The second output of reset pulse generator 84 in master unit 48 is utilized as the 360 degree reset signal to the several individual units 50 through 60, being applied thereto through the respective firing order control switches 92 through 102. One individual control unit will be set in the 360° position and will be in phase with master counter 88, while the remaining five individual units will be symmetrically phased throughout the complete cycle of the machine drive.

The amplified pulse output of pulse generator 82, constituting one pulse for every degree of rotation of machine drive shaft 86, is counted by the three-decade master counter 88, which converts these pulses into numbers in the base 10, as indicated by the several units (OU), tens (OT) and hundreds (OH) lines interconnecting master counter 88 and gating board 90. The outputs of gating board 90 constitute selected counts of master counter 88. More specifically, gating card 90 outputs include master counter counts 60, 72, 120, 144, 180, 216, 240, 288 and 300. The first, third, fifth, seventh and ninth of these counts are the counts which are utilized as inputs to the firing order control switches with six active machine sections, whereas the second, fourth, sixth and eighth counts are those utilized with five active machine sections. In either case, the set of counts represents an even division of the complete cycle of the machine. In six-section operation, the reset outputs of the firing order control switches are thus 60° apart, while the reset pulses for five-section operation are 72° apart.

The six firing order control switches 92 through 102 are manipulated in a desired configuration so as to determine the ordered sequence of operation of the six individual units 50 through 60 and the respective machine sections corresponding thereto. Assuming that six-section operation is contemplated, and that the six firing order control switches 92 through 102 have been set to determine which machine section fires first, which fires second, and so on, when the master counter 88 reaches the count 060, representing 60° of rotation of the machine, a signal will be gated by gating board 90 through the particular firing order control switch set for the 060 count, corresponding to the second firing position. This particular firing order control switch passes the signal to its respective individual unit 50 through 60 to reset the counter therein to 000, the fiducial or zero degree position for the particular individual unit, which unit and the machine section corresponding thereto will thus fire in the number two position, following the master counter 88 by 60°. The five remaining firing order control switches and associated individual units are controlled in like manner.

Master unit 48 also generates the drive signal for the shear cut readout, and in this connection the output of pulse generator 82 is applied to shear cut generator 106, which divides the pulses applied thereto by six, providing an output signal corresponding to tenths of shear cuts (since, in a six-section machine, there are six shear cuts per drive shaft revolution). This output of shear cut generator 106 constitutes the clock signal to a three-decade shear cut counter 108, the output of which is applied to a three-decade memory 110.

A four-decade counter 112 counting zeros, tens (OT), hundreds (OH) and thousands (OTH), counts a 60 HZ line frequency to a count of 3,600, whereupon a signal is gated through sync readout board 114 to clock memory 110 once each minute, whereupon shear cut counter 108 is reset. Shear cut counter 108 thus counts a signal which represents tenths of shear cuts, and every minute this information is transferred to memory 110, which stores the reading for the following minute, while displaying such reading on the four digit readout 63.

Readout means 63 is preferably a four digit Nixie tube display driven by Nixie tube readout driver circuits generally designated by reference numeral 111. However, only a three-decade shear cut counter 108 is necessary, since the hundreds position of the readout means need display only a zero (OH) or a one (IH), and a full decade in the counter or in the memory is not needed to generate only these two digits. Instead, sync readout board 114 contains a flip-flop memory for these two digits. If shear cut counter 108 counts past its maximum number, 99.9, before the one minute time base signal is received, the reading on the readout means will be larger than 100.0. The 100 flip-flop is then set so that upon occurrence of the one minute time base signal it will switch, and a 100 will be displayed on the readout. On the other hand, if the one minute time base signal is received before the shear cut counter 108 reaches 99.9 plus 0.1 counts, the reading displayed will be less than 100.0, and a zero will be displayed in the hundreds position of the readout.

It is to be understood that the aforedescribed circuitry of FIGS. 3A and 3B as well as the circuitry to be described with respect to FIG. 4 include power supplies (not shown) having voltage regulators, the latter of which will be described hereinafter with respect to FIG. 7.

The block diagram of FIG. 4 is illustrative of the circuitry within each of the active individual units 50 through 60, as well as the spare unit 62. Each of these units contains a 15-volt direct current power supply (not shown) to power all the logic circuits therein, along with a 12-volt alternating current transformer (not shown) for operation of the output valves. Further, each unit includes three counter cards, one synchronizing card, one stop-start card, one Triac card, twelve function control cards and one voltage regulator card. An additional test clock card may also be provided, though it is not used during normal operation. As was previously stated, each individual unit includes on the drawer front panel the 48 three-decade thumbwheel switches which correspond to the respective machine section functions which are controlled thereby. The pulse output of pulse generator 82 in master unit 48 is applied as an input to the three-decade section counter 118. This counter uses base 10 coding, and includes three counter cards, one for each of the units (0 to 9U), tens (0 to 9T) and hundreds (0 to 9H) decades. The outputs of section counter 118 are applied in parallel to the 48 thumbwheel switches of the individual unit, two of which switches are shown in FIG. 4 at 120 and 122. It will be understood that these 48 thumbwheel switches act as gates which pass the applied signal when the count reaches the three digit number to which the individual switch is set. When a switch gates a signal applied thereto, the output is applied to one of 12 function control boards included in each individual unit, one of such function control boards being indicated at 124 in FIG. 4. Each of the 12 function control boards is connected to and driven by four of the 48 thumbwheel switches. The output of function control board 124 is applied through output cable 126 to appropriate solenoid windings for operating associated valves in valve block 64, for example, as shown in FIG. 1.

The signal from the section counter 118 is 1° of rotation in length, this length varying from approximately 8 to 40 milliseconds, depending upon the speed of the machine. The function control boards convert this signal into a fixed-length pulse of approximately 100 milliseconds length. Accordingly, for this 100 milliseconds, 12 volts of 60 HZ power is applied to the respective valve, thus ensuring operation of the valve, irrespective of the speed of the machine.

As was stated in connection with the description of FIG. 3, the outputs of the several firing order control switches 92 through 102 are applied as reset signals to the several respective individual units 50 through 60. In the circuit shown in FIG. 4, the reset signal from the master unit is applied to sync board 128, the output of which resets section counter 118.

Figure 14:
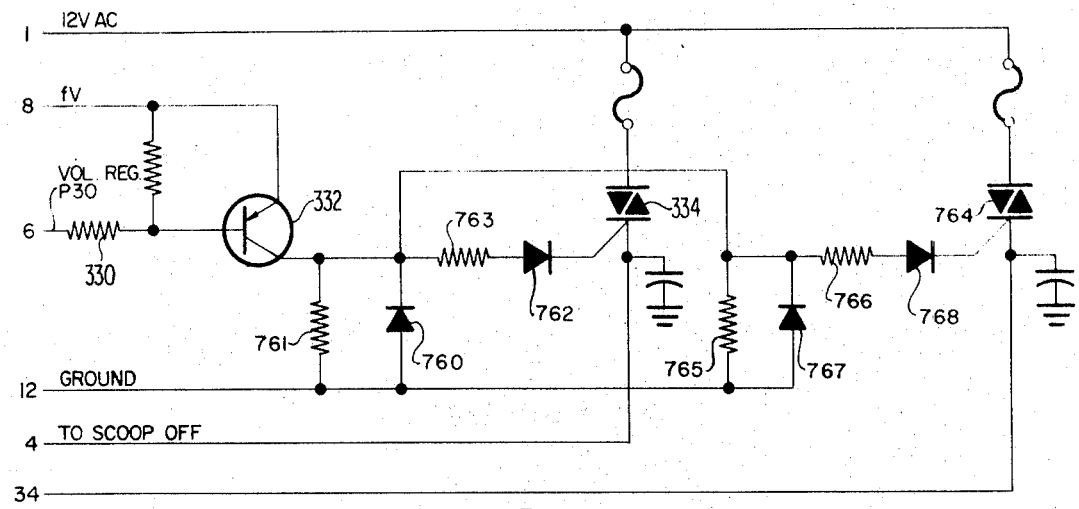

The circuits of each of the individual units as exemplified by the block diagram of FIG. 4 also include emergency stop circuitry 130 and programmed stop circuitry 132, each of which serves to inhibit the operation of function control board 124 (or the like) and the valves controlled thereby, as will be further explained. In addition, a Triac board 131, to be described in more detail with respect to FIG. 14, is connected between program stop circuitry 132 and output cables 126 for providing a pulse to the scoop valve off as will be discussed hereinafter.

Certain ones of the printed circuit cards or boards employed in the circuitry of the preferred form of this invention are found only in master unit 48, while others are found only in the individual units 50 through 62 and still others are common to both the master and individual unit circuits. The boards common to both types of circuits include a counter board, a sync board and a voltage regulator board. The boards peculiar to the master unit circuitry include an amplifier board, a gating board, a memory board and a sync readout board, while the boards unique to the individual unit circuitry include a stop-start board, a Triac board, a function control board, an emergency stop relay board and a test clock board. It is to be understood that only one of each group of identical cards, boards or circuits will be described in detail. In this regard, for purposes of clarity, the various pin interconnections will not be described during the detailed description of the cards, boards or circuits, but rather, will be illustrated in block diagram thereafter.

Figure 5:
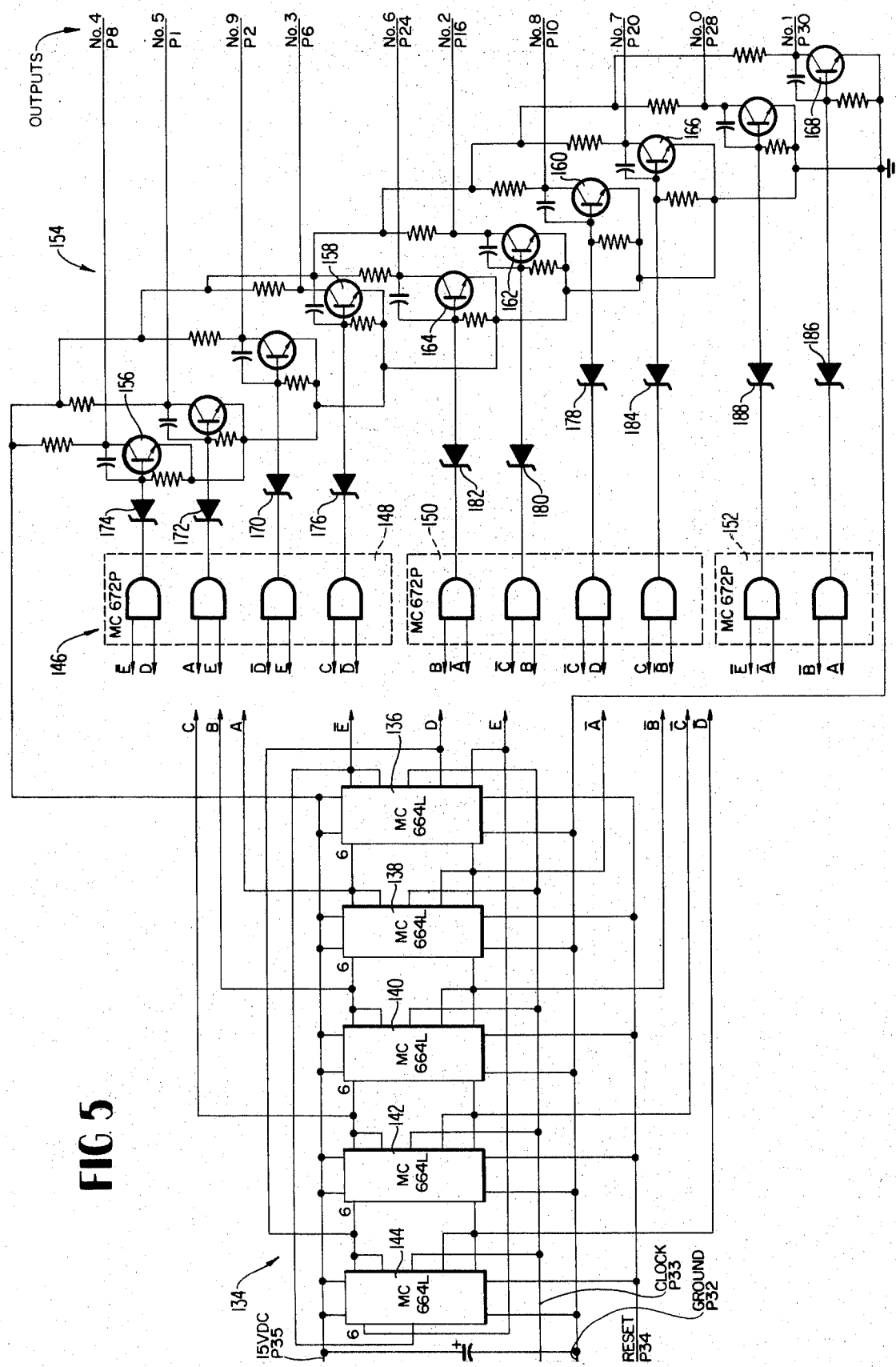
FIGS. 5 through 16 are schematic diagrams of the several component circuits utilized in the circuitry shown in block diagram form in FIGS. 3 and 4.

The several counter boards are identical, and the circuitry of one such board is disclosed in detail in FIG. 5. As may be seen in FIG. 5, the board includes a basic phase shift counter 134, comprising integrated circuit flip-flops 136, 138, 140, 142, and 144, and decoding means 146 comprising three quad dual-input NAND gates in the form of integrated circuits 148, 150, and 152.

In the circuitry of FIG. 5, when the reset line is made low, all of the Q outputs at pins 6 of flip-flops 136 through 144 go low. Upon the occurance of the trailing edge of each successive clock pulse, the output of one flip-flop will go high, beginning with flip-flop 132 and continuing to flip-flop 144. When all of the flip-flop outputs are high, the next subsequent clock pulse will make the output of flip-flop 136 low, and the next will render the output of flip-flop 138 low, and so on, repetitively.

These outputs of flip-flops 136 through 144 are decoded by decoder 146 comprising NAND gates 148, 150 and 152, the outputs of which represent the numbers 0 to 9 in base 10. The 0 to 9 outputs of each decade go to all of the 48 switches for that decade, and the switches act as AND gates, gating the output of the counter to the function control card. This output of the counter represents degrees of rotation of the individual section machine drive shaft.

Since each individual unit 50 through 60 contains 48 thumbwheel switches, and since one decade of all of the switches could be set on the same number, transistor power amplifiers, indicated generally at 154, are included in the outputs of NAND gates 148, 150 and 152. Each of these NAND gates has an output loading factor of 10, meaning that each gate can drive 10 other gates. But if all of the switches of one decade were set at the same number, a loading factor of 48 would be present. Accordingly, transistors 156 through 168 act as power amplifiers to increase the output loading factor from 10 to 48. All of the transistors are, as shown, in the common emitter mode, so that if the base thereof goes high, the collector goes low.

Zener diodes 170 through 188 are included in the circuitry of FIG. 5 for high noise immunity while rendering the input of the transistors compatible with the outputs of the NAND gates. In this preferred embodiment, these are either 11 or 12 volt Zener diodes, whereas the integrated circuits require a power supply of 15 volts. The output of each integrated circuit may then swing between 0 volts for a logic "0" and 15 volts for a logic "1." But, as a result of temperature and loading, the output of each gate may be 1.5 volts below 15 volts or 1.5 volts above 0 volts. With the Zener diodes present, if the output of an integrated circuit gate goes to 1.5 volts for a logic "0," the transistor will be off. Correspondingly, if the output of an integrated circuit gate goes to 13.5 volts for a logic "1," the transistor will be on. Also, small fluctuations in the output of the NAND gates due to noise will not switch the transistors. The capacitors connected between the base and the collector of each transistor are present to cause the transistors to switch more sharply.

Each individual unit counter is reset back to 0, 0, 0 by a signal from the master unit gating card, which signal first goes to the individual unit sync card and then on to the unit counter.

Figure 6:
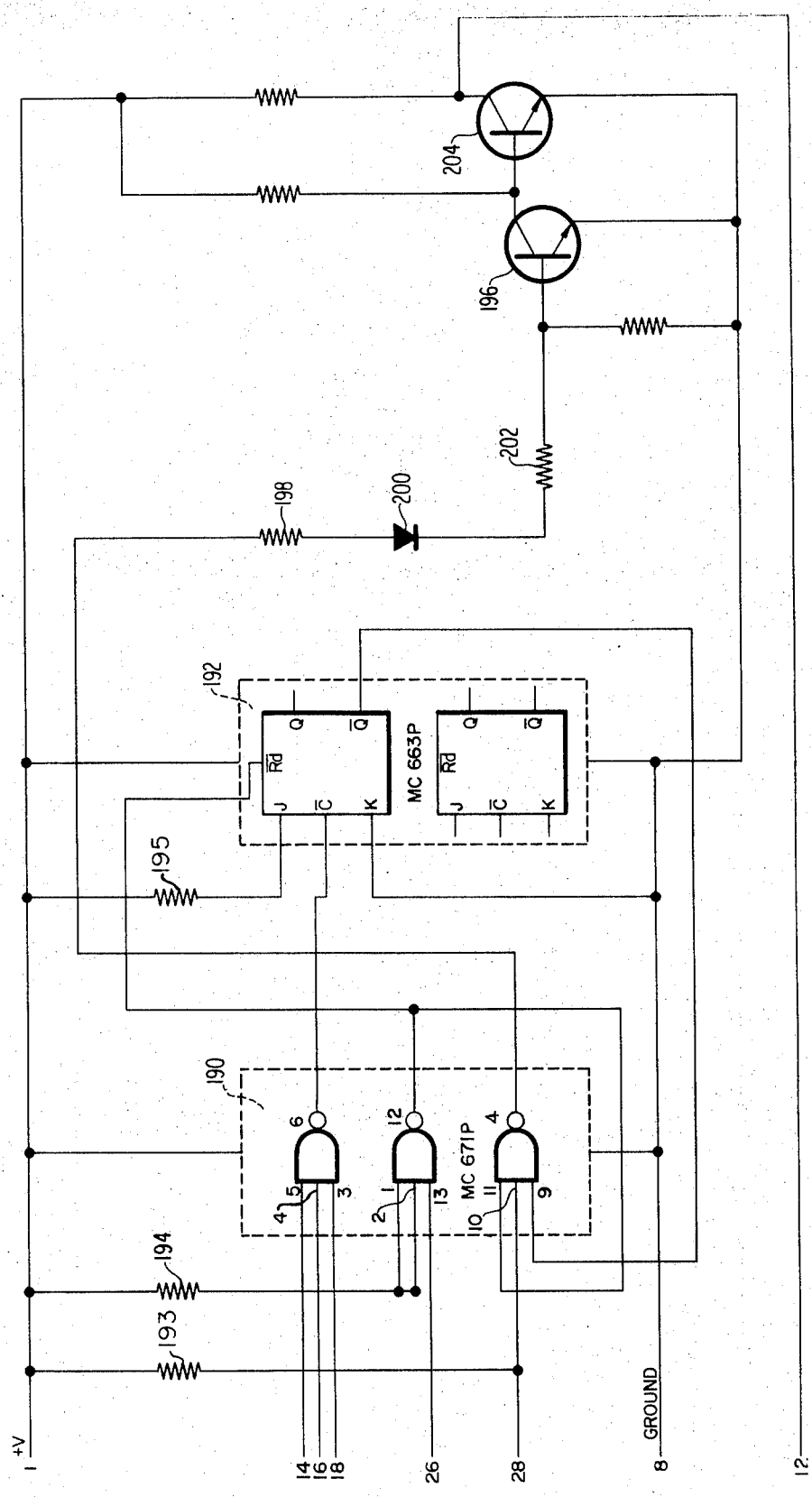

FIG. 6 shows the detailed circuitry of the sync boards common to both the master unit and the several individual units. As may be seen, the sync board is composed primarily of a triple three-input NAND gate 190 and a flip-flop forming a part of integrated circuit 192. The sync board serves two purposes, viz., ensuring that the counter resets on the reset signal and power amplifying the reset signal. The reset signal from the gating board in FIG. 3 goes to five of the six unit sync boards, whereas the sixth unit receives its reset signal from the reset generator in FIG. 3; this latter unit is the one that is in position 1 in the firing order as controlled by the firing order control switches, also shown in FIG. 3. Insofar as the electronic circuitry is concerned, any one of the individual control units (along with its associated section of the machine) may be placed in the number one firing position, but ordinarily mechanical limitations in the machine restrict the choice of number one firing position to either of machine sections one or six.

Referring again to FIG. 6, the reset signal is applied to pin 13 of integrated circuit NAND gate 190, pins 1, 2 and 13 being the inputs to one of the three gates therein. Pins 1 and 2 are held high by resistor 194, whereas pin 13 is normally high. When pin 13 goes low upon the occurance of the reset signal, the output of this gate, pin 12 of integrated circuit 190, goes high. But pin 12 of integrated circuit 190 constitutes one input to the bottom gate thereof, the other two inputs to this gate at pins 9 and 10 being high at this time. Consequently, the output of this latter gate at pin 8 of integrated circuit 190 goes low. Current now stops flowing into the base of transistor 196 through resistor 198, diode 200 and resistor 202. Transistor 196 turns off, and transistor 204 goes into saturation. The collector of transistor 204 is the reset to the individual unit counter. When transistor 204 saturates, the collector thereof goes low, resetting the counter. When the counter goes to 0, 0, 0, the outputs of the counter go high, and pins 3, 4 and 5 of the top gate in integrated circuit 190, to which these outputs are connected, also go high. When this occurs, pin 6 of integrated circuit 190 goes low, this being the clock input to the flip-flop of integrated circuit 192. With this clock low, the output at pin 13 of integrated circuit 192 is low and pin 8 of integrated circuit 190 goes high. Thereupon, transistor 196 saturates, and transistor 204 turns off, whereupon the reset to the individual unit counter is removed, and the counter may start counting up from 0, 0, 0.

The reset signal thus stays on until the counter resets, and is then removed, since the counter will not count if the reset signal stays low. This circuit adjusts the length of the reset to be just long enough to reset the counter, assuring that all three decades of the counter go to 0.

When the reset signal from the gating board in FIG. 3 goes high, pin 12 of integrated circuit 190 goes low, and pin 13 of integrated circuit 192 goes high, and the circuit is now ready for the next reset signal. In this regard, it should be noted that the resistors 193, 194 and 195 connect the positive voltage line to the various inputs of the NAND gates of integrated circuit 190 and flip-flop of integrated circuit 192 so as to maintain these inputs at a high level. On the sync board in the master unit of FIG. 3, the pulse generator clock signal is applied to the board at pin 10 of integrated circuit 190.

Figure 7:
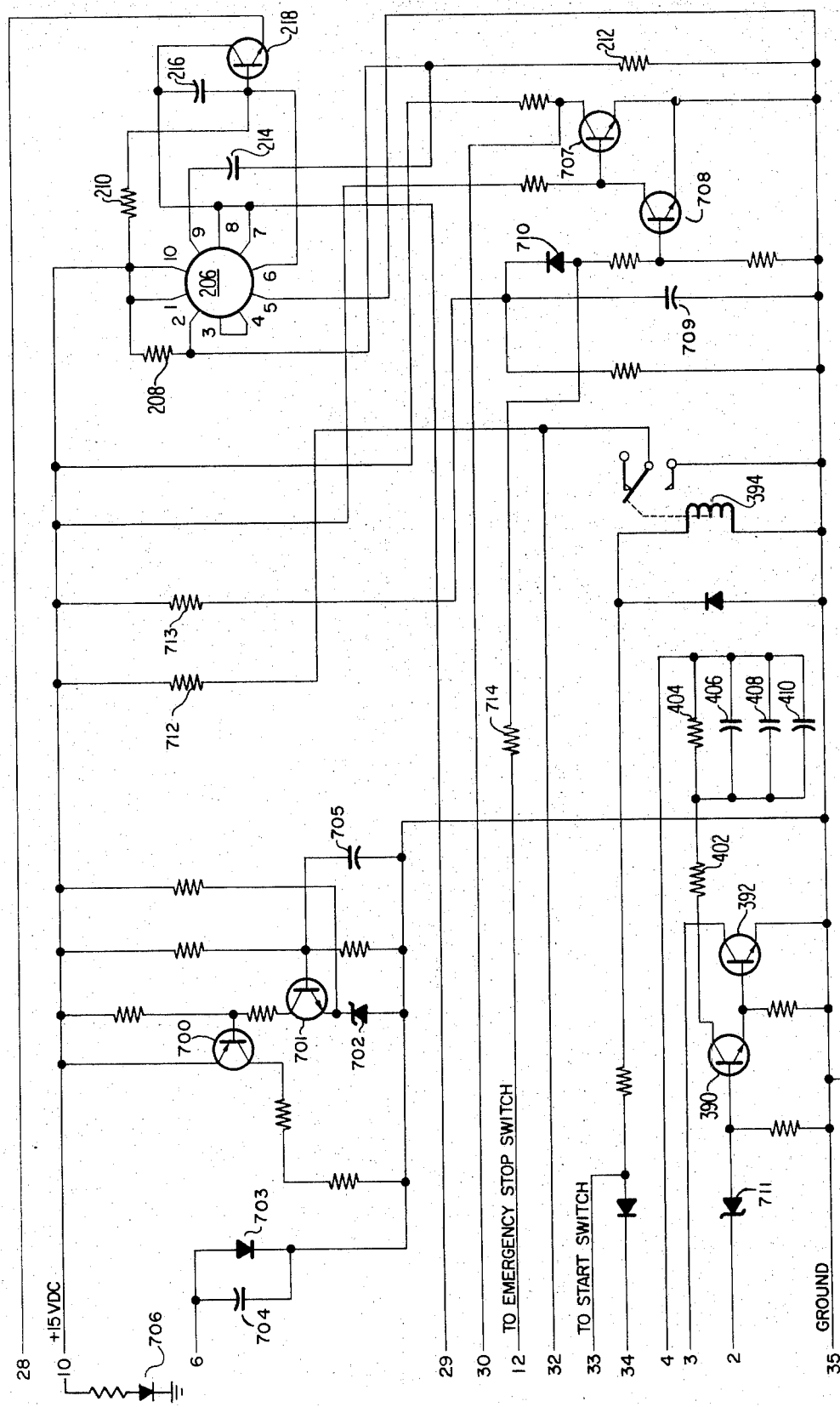

Another circuit board common to both the master unit of FIG. 3 and the individual units exemplified by FIG. 4 is the voltage regulator board, shown in detail in FIG. 7. The voltage regulator circuit comprises integrated circuit 206, resistors 208, 210, and 212 and capacitors 214 and 216. Transistor 218 is added as a driver to increase the output current of integrated circuit 106. In addition, a circuit including transistors 700 and 701, Zener diode 702, siliconcontrolled rectifier 703, filter capacitor 704, slow down capacitor 705, diode 706 and associated limiting and biasing resistors (not numbered) is connected between the 15 volt DC power line and ground of the voltage regulator board. This circuit acts as an over-voltage trip circuit, that is, the 15 voltage line is compared to the voltage across Zener diode 702. In the event there is an over-load situation, the transistor conducts so as to gate the silicon-controlled rectifier which, in turn, shorts the voltage line to ground through a limiting resistor and diode 706. Simultaneously therewith, a circuit breaker (not shown) is actuated so as to provide an open circuit.

Another circuit, including transistors 707 and 708, capacitor 709, diode 710 and limiting, dividing and biasing resistors (not numbered), is provided to reset the stop-start circuitry, the latter of which includes a plurality of flip-flops. When the emergency stop push button 324 (FIG. 13) is actuated, transistor 708 turns off and transistor 707 turns on. This pulls the collector of transistor 707 down so as to reset all of the flip-flops. During initial start-up of the entire machine, capacitor 709 maintains transistor 708 in its off state while transistor 707 is on for a short duration to make sure that the flip-flops are in proper position. In addition, the transistors 390, 392, resistors 402, 404 and capacitors 406, 408 and 410 are provided for putting a delay on the line after the start button 328 (FIG. 13) is actuated so as to make sure the OFF valves are in their OFF state. Further, Zener diode 711 is provided for reducing electrical noise while resistor 712, 713 and 714 are utilized to maintain a high input to the various flip-flops.

Figure 8:
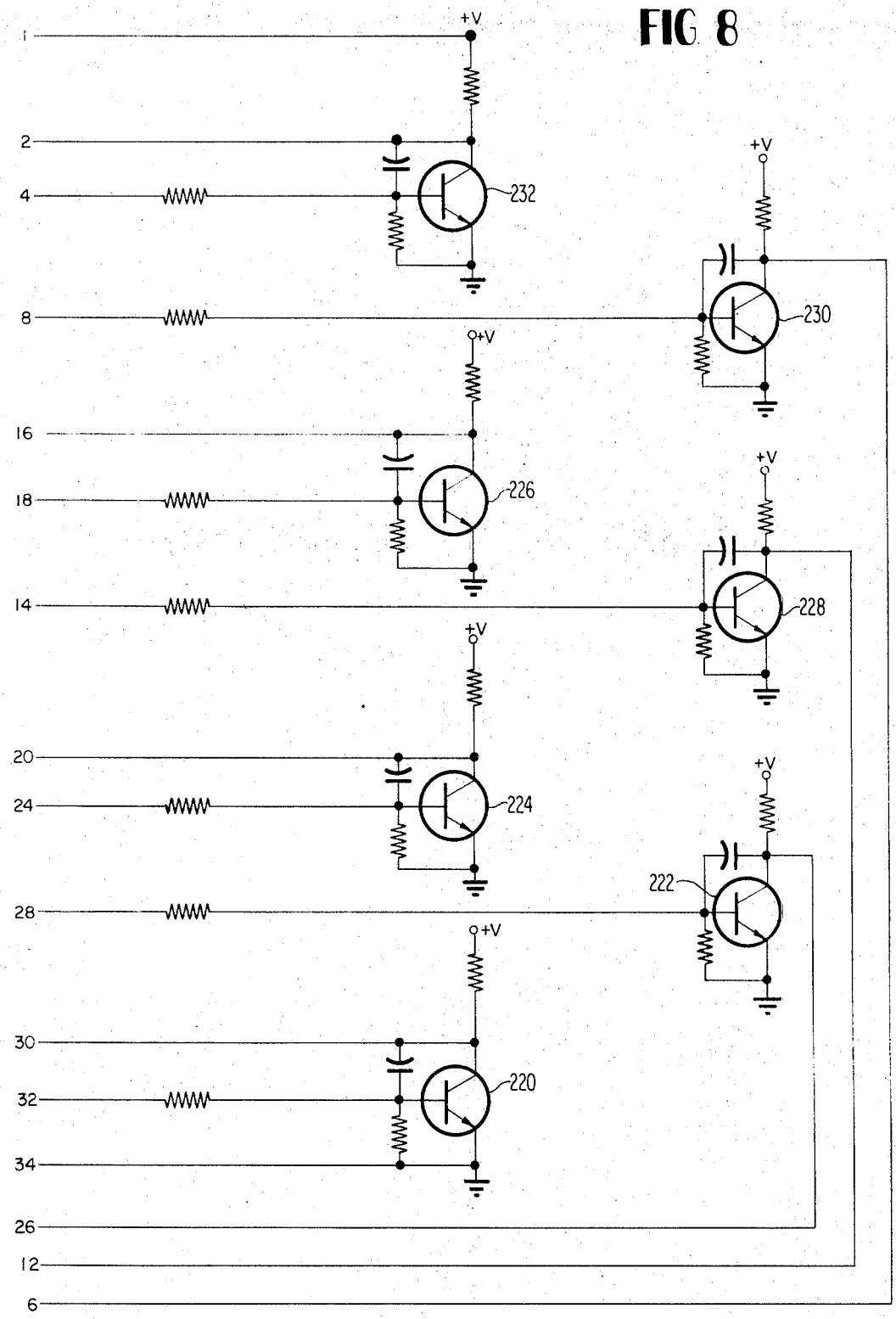

Turning now to the circuit boards which are peculiar to the master unit of FIG. 3, one such circuit is the amplifier board of FIG. 8, which circuit is used to amplify the signal from the pulse generator. As may be seen, the board comprises seven transistor amplifiers 220 through 232 each of which includes bias resistors, a load resistor and a capacitor for preventing oscillation during the transistors switching states. An output from each of these transistors constitutes the clock for one of the counters, one for the master unit and six for the active individual units.

Figure 9:
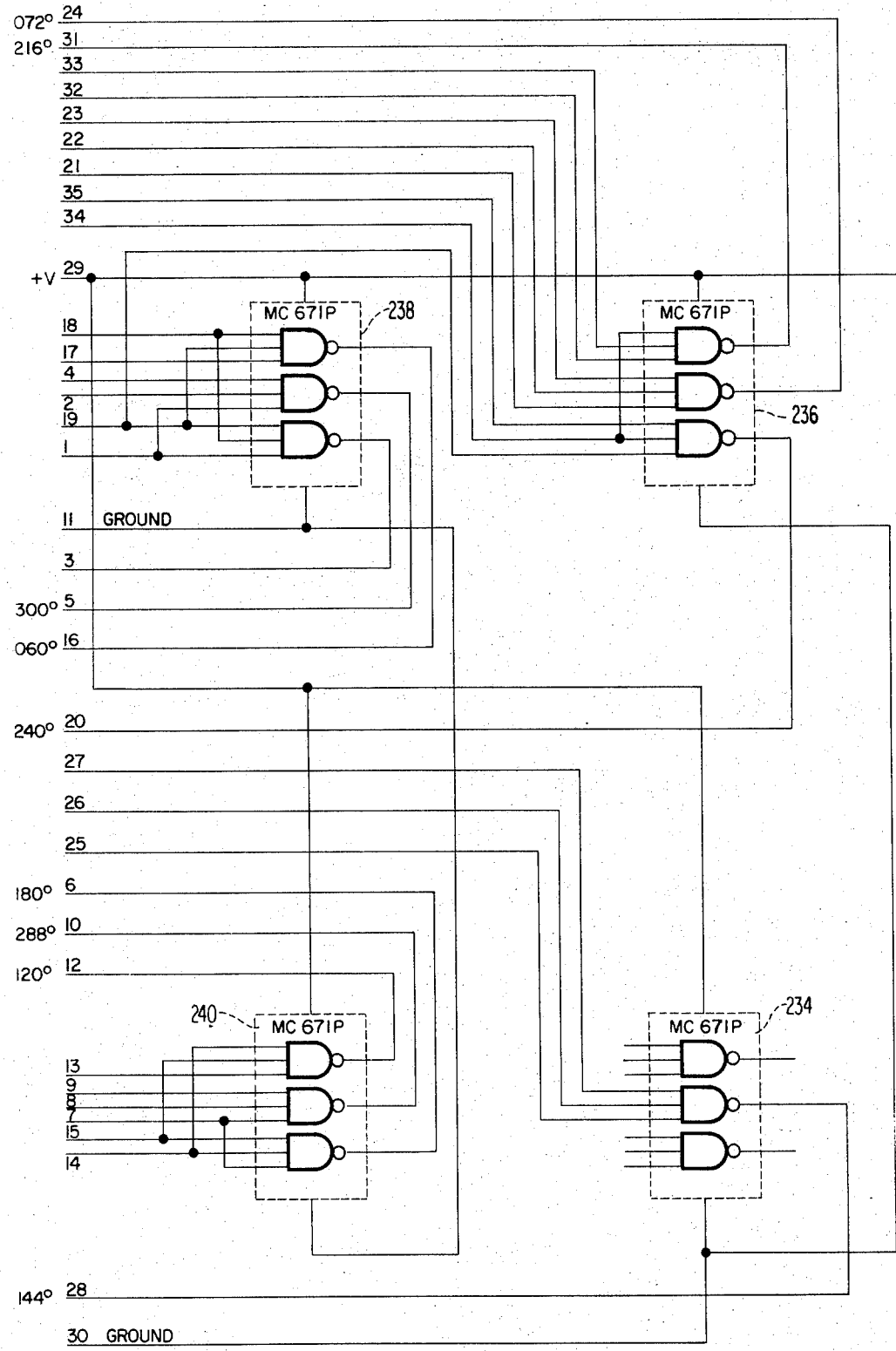

Another circuit board of the master unit is the gating board 90, shown in FIG. 9 as constituting four integrated circuits 234, 236, 238 and 240, each constituting three three-input NAND gates. This board gates the outputs of the master counter 88 together to generate the reset signals for the individual control units by way of the six rotary switches which control the firing order.

Figure 10:
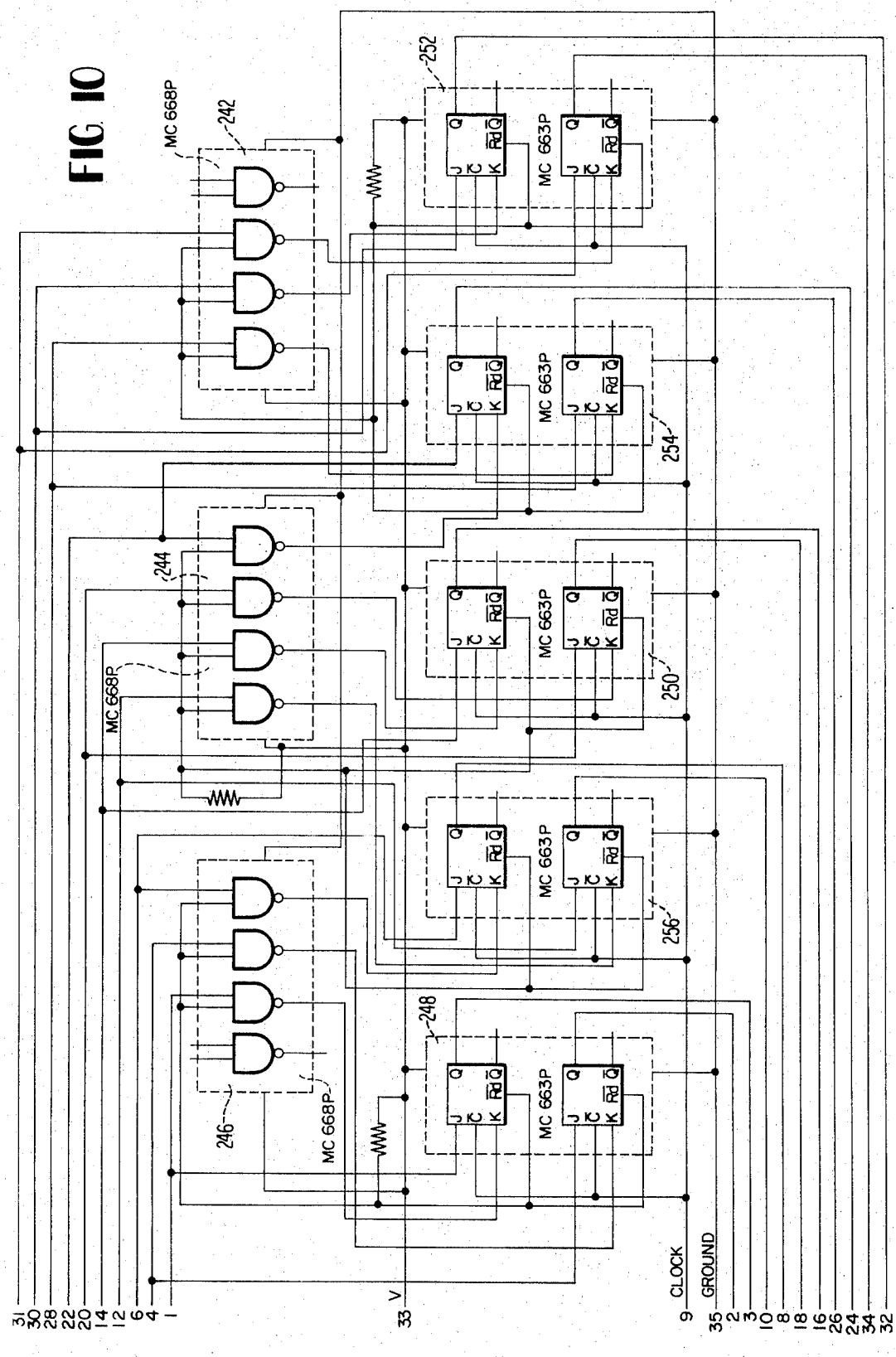

The memory board 110 of the master unit shown in FIG. 3 is shown in detail in FIG. 10, including integrated circuits 242, 244 and 246, each of which is a quad two-input NAND gate, and integrated circuits 248 through 256, each of which are dual JK flip-flops.

This memory board stores the reading of the shear cut counter 108 in FIG. 3 and displays that reading at readout means 63.

In the operation of the circuitry of FIG. 10, with the J input high and the K input low, the trailing edge of the clock will make the Q output of these flip-flops high. The J input is connected to the output of the shear cut counter 108, which is also inverted with one of the gates for the K input. The clock is derived from the one minute time base counter 112 in FIG. 3, and the Q outputs of the flip-flops go to the readout driver circuits 111 which control the reading on the readout means 63.

There are three memory boards located in the master unit, and the J and the K inputs to the flip-flops will change with the output from shear cut counter 108. The outputs of the flip-flops will not change as long as the clock is low, but on a signal from the time base counter 112, the clock will go high and then low and clock all the flip-flops, which will now switch according to the number in the shear cut counter 108 when the clock went low. The flip-flops will then hold this reading for the subsequent minute.

Figure 11:
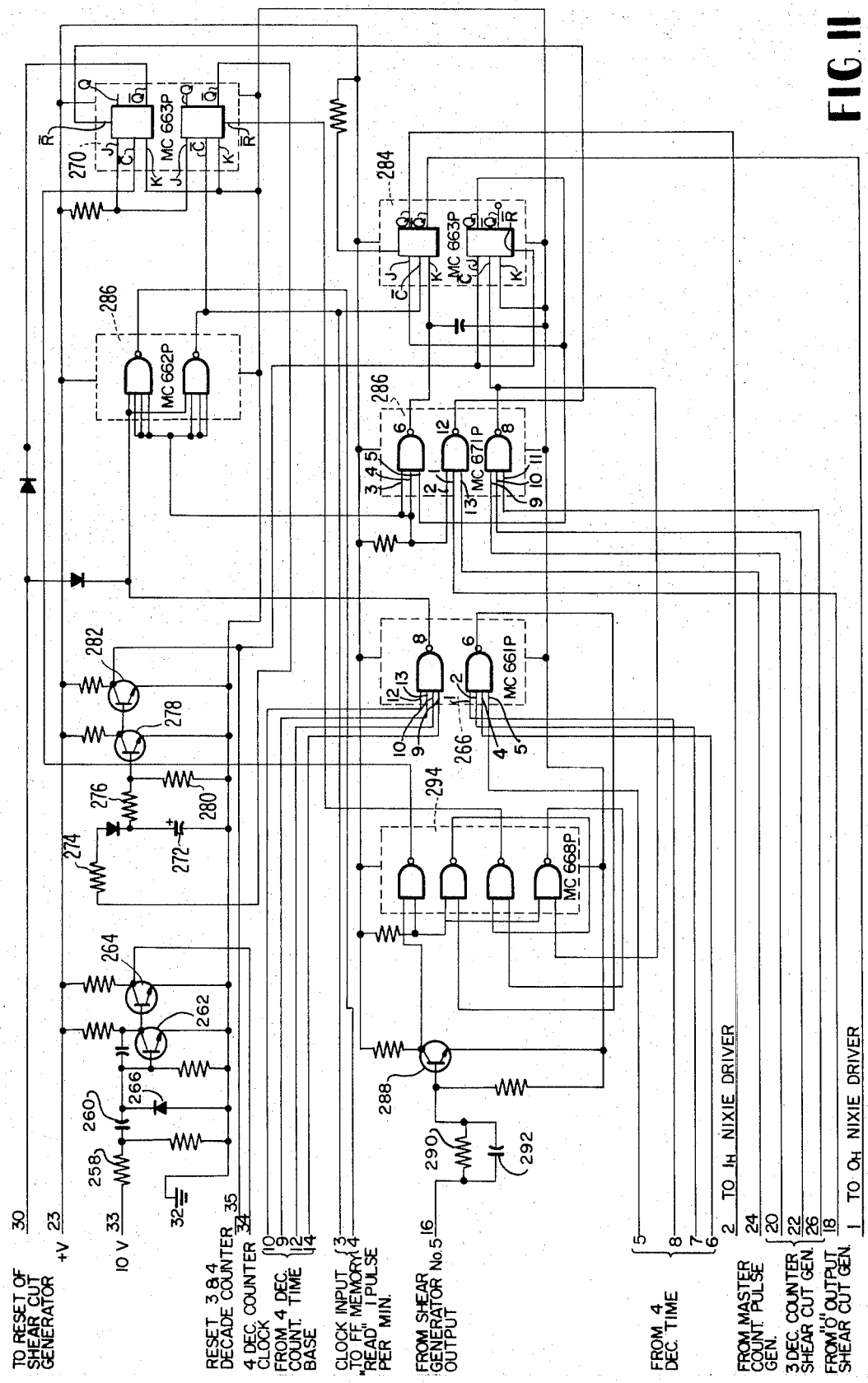

The readout sync board 114 of FIG. 3 is shown in detail in FIG. 11. In this circuit, 60 HZ voltage from a 10 volt transformer is applied through resistor 258 and capacitor 260 to transistor 262. When the voltage at resistor 258 goes positive, it supplies base current to transistor 262, whereupon that transistor saturates and transistor 264 turns off. The negative half of the alternating current signal is shunted through diode 266, capacitor 260 and resistor 258, whereupon transistor 262 turns off and transistor 264 saturates. Thus, one cycle of 60 HZ voltage is converted into a square wave.

The output of transistor 264 constitutes the clock for the four-decade counter 112, the time base counter. The 3,600 output of this counter is connected to pins 9, 10, 12 and 13 of integrated circuit 266. These inputs to integrated circuit 266 thus go high, and pin 8 thereof goes low. The output at pin 6 of integrated circuit 286 then goes high, as does the output at pin 8 of integrated circuit 286. On the trailing edge of the 3,600 count of the four-decade counter 112, pin 9 of integrated circuit 266 goes low. Output pin 8 of integrated circuit 266 goes high and pins 6 and 8 of integrated circuit 286 go low. These two output pins of integrated circuit 286 constitute the clock input to the three-decade flip-flop readout memory 110, whereupon the memory "reads" the shear cut counter 108 and stores the reading for the subsequent minute.

When pin 8 of integrated circuit 286 goes low, it clocks one of the flip-flops of integrated circuit 270, pin 13 of which now goes low. This pin 13 had been supplying current to capacitor 272 through resistor 274 to keep it charged. However, capacitor 272 now discharges through resistor 276 through the base of transistor 278 and resistor 280. When capacitor 272 thus discharges, transistor 278 turns off, and transistor 282 now goes low and resets the shear cut counter 108, as well as the time base counter 112, back to zero. Transistor 282 also resets one of the flip-flops of integrated circuit 284, which controls the hundred decade of the readout means 63.

When shear cut counter 108 counts through 99.9 to 00.0, pins 9, 10 and 11 of integrated circuit 286 go high, and output pin 8 thereof goes low, clocking a flip-flop of integrated circuit 284. This sets the J and K inputs to the other flip-flop of integrated circuit 284. If the shear cut counter 108 counts through 00.0 before the occurence of the time base clock signal, a number larger than 100.0 will be indicated. The time base clock also clocks the flip-flop of integrated circuit 284 whose output pins are 8 and 13, each of which is connected to the readout driver circuit 111.

Shear cut generator 106 is a one-decade counter board, the output of which is applied to the base of transistor 288 through resistor 290 and capacitor 292. When this input to transistor 288 goes high, the collector of the transistor goes low, and pin 11 of integrated circuit 294 goes high. On the trailing edge of this count, pin 11 of integrated circuit 294 goes low, clocking a flip-flop of integrated circuit 270, pin 1 of which then goes low, resetting the shear cut counter board 108 back to zero. The zero output of this counter is connected to pin 1 of integrated circuit 286, and when this pin goes high and the master counter clock is high, output pin 12 of integrated circuit 286 goes low, thus resetting the flip-flop of integrated circuit 270, whereupon pin 1 of integrated circuit 270 goes high. The one-decade counter constituting shear cut generator 106 will now count from zero to five and then reset to zero. It will be understood that any one of these outputs may be used as the shear cut generator output, since they represent the pulse generator output divided by six.

Figure 12:
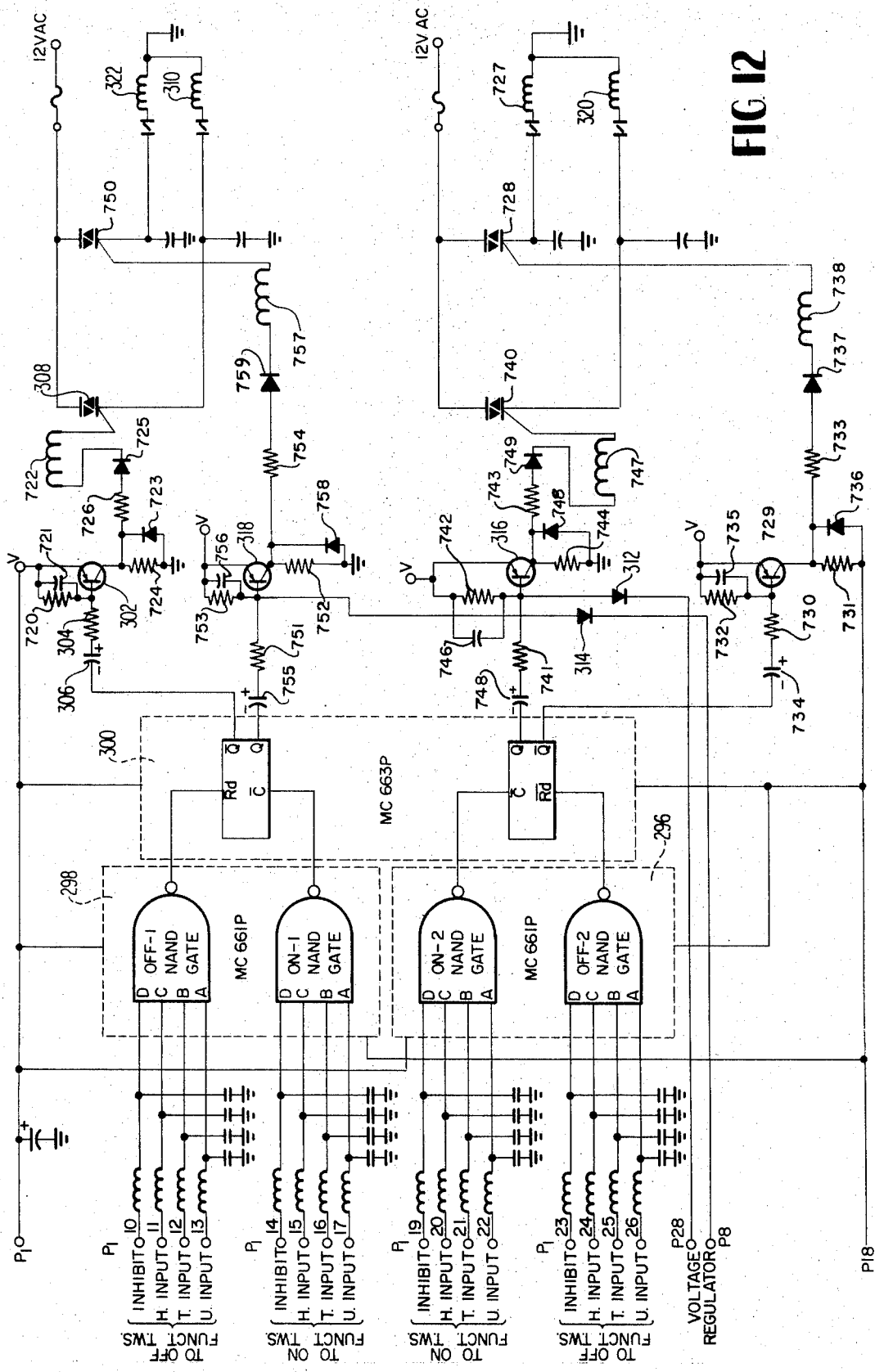

One of the circuit boards unique to the individual unit circuitry as exemplified in FIG. 4 is the function control board, one of which is shown in detail in FIG. 12, in which figure is also included the circuitry to which the output of the function control board is applied, including the valve-operating solenoid circuitry. The basic circuitry of the function control board includes a pair of dual four-input NAND gates 296 and 298, the outputs of which are applied to respective flip-flops of the dual flip-flop integrated circuit 300. The function control board serves to gate the output of the thumbwheel switches and the stop-start board together to activate a Triac, which, in turn, operates a function-controlling valve. Each of the twelve function control boards in the respective individual unit sections is characterized by the 2 on and 2 off functions. The outputs of a three-decade thumbwheel switch are gated into a four-input NAND gate, along with one output from the stop-start circuitry, this latter signal constituting the inhibit signal. All inputs to the gate must be high for the output of the gate to go low, and thus when the inhibit line goes low, the function associated with the gate will not be performed.

If the three thumbwheel switch outputs connected to pins 1, 2 and 4 of the lower gate of integrated circuit 298, for example, go high, when the inhibit signal at pin 5 of such gate is also high, the output at pin 6 of integrated circuit 298 goes low. This is the clock to the upper flip-flop of integrated circuit 300. On the trailing edge of this clock, output pin 13 of integrated circuit 300 goes low, and current flows through the base of transistor 302 through resistor 304, charging capacitor 306. This base current will flow for approximately 100 milliseconds, and during such flow transistor 302 saturates and supplies gate current to Triac 308, which supplies 12 volts of alternating current power to the ON valve solenoid 310 for the particular function. In this regard, it should be noted that the RC network comprising resistor 720 and capacitor 721 and inductor 722 are provided in the circuitry for reducing electrical noise. In addition, the diode 723 connected across load resistor 724 and diode 725 connected in series with load resistor 726 are provided for preventing reverse voltage from appearing at the gate of Triac 308.

It should be noted that identical circuitry is utilized for energizing ON valve 723, as illustrated, this circuitry includes Triac 728, transistor 729, resistors 730, 731, 732, 733, capacitors 734, 735, diodes 736, 737 and inductor 738.

Two voltages from the voltage regulator board are applied respectively through diodes 312 and 314 to the bases of transistors 316 and 318. During the start-up procedure, the voltage on these two lines is made low, turning on transistors 316 and 318 and, in turn, activating the OFF valves 320 and 322, enabling the section to start properly. Again, it should be noted that the circuitry associated with transistors 316 and 318 is identical to the circuitry associated with transistor 302. The circuitry associated with transistor 316 includes Triac 740, resistors 741 to 744, capacitors 745, 746, inductor 747 and diodes 748 and 749 while the circuitry included with transistor 318 includes Triac 750, resistors 751 to 754, capacitors 755, 756, inductor 757 and diodes 758 and 759.

Figure 13:
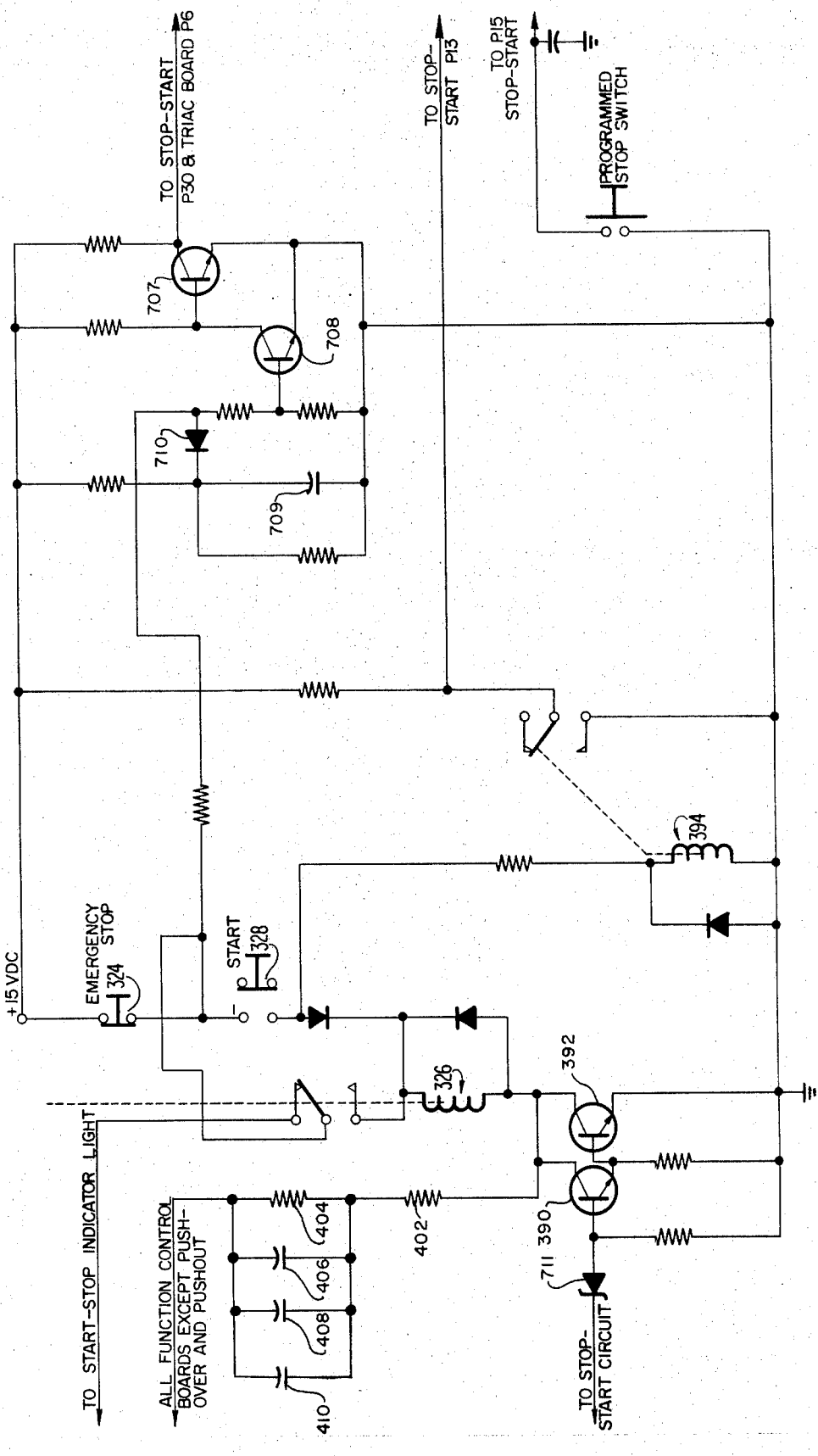

The emergency stop relay circuit 130 of FIG. 4 is illustrated in detail in FIG. 13, showing the connections between the start and stop switches and the relays and relay drivers. When the emergency stop switch 324 is opened, current from the 15 volt line to relay 326 is interrupted, and the latter drops out, leaving the contacts as shown in FIG. 13. The relay cannot be pulled in again until start switch 328 is closed. It should be noted that the circuitry including transistors 707, 708, capacitor 709, diode 710 and associated resistors has been described with respect to FIG. 7 and reference is made thereto.

The individual unit circuits also include a Triac board, the details of which are shown in FIG. 14. The purpose of this board is to pulse the scoop valve off when the stop button is pressed. Upon emergency stop, a signal is generated in the voltage regulator board and fed to the Triac board, being applied through resistor 330 to the base of transistor 332. When this signal goes low, transistor 332 turns on and supplies gate current for Triac 334, the output of which is connected to the scoop off valve. The diode 760 connected across load resistor 761 and the diode 762 connected in series with load resistor 763 are provided for preventing reverse voltage from appearing at the gate of Triac 334. The remaining circuitry of FIG. 14 including Triac 764, resistors 765, 766 and diodes 767 and 768 is utilized as a spare.

Figure 15:
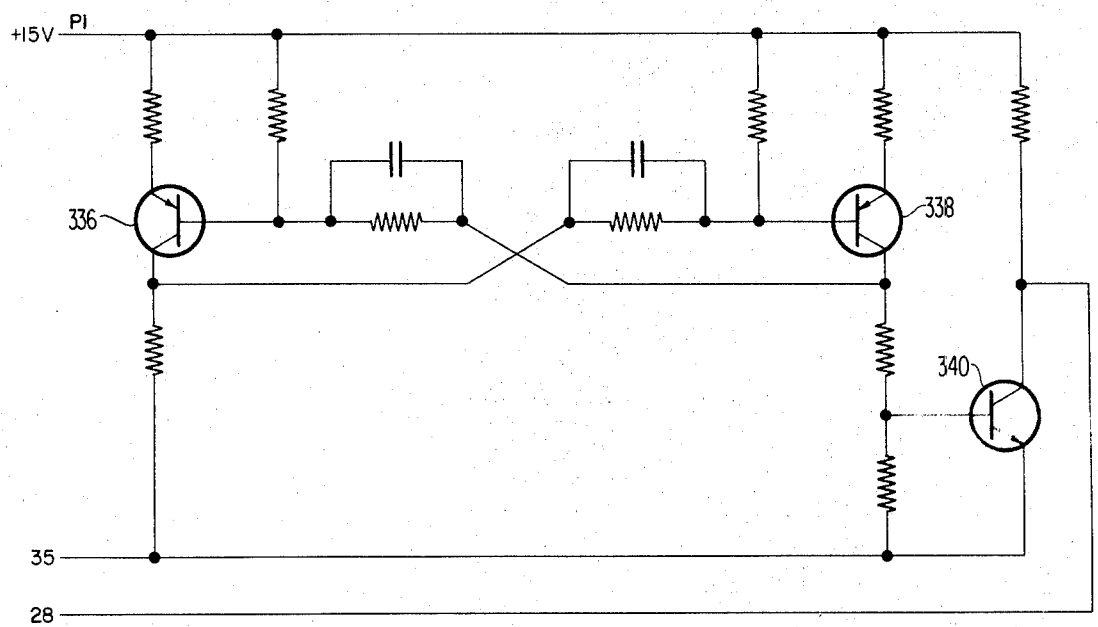

The test clock board of the individual unit circuitry is shown in detail in FIG. 15, comprising basically an astable multivibrator circuit. In one condition, transistor 336 is saturated and transistor 338 is turned off. When the latter saturates, the former turns off. With transistor 338 saturated, transistor 340 will be in the off condition, and the collector of transistor 340 is at 15 volts, the output of this transistor thus comprising a square wave. This test clock board is employed as a replacement for the signal from the pulse generator for trouble-shooting in a bench test of the individual unit circuitry, and is not employed during normal operation of the circuit. The remaining associated circuitry in this FIGURE is conventional, requiring no explanation thereof.

Figure 16:
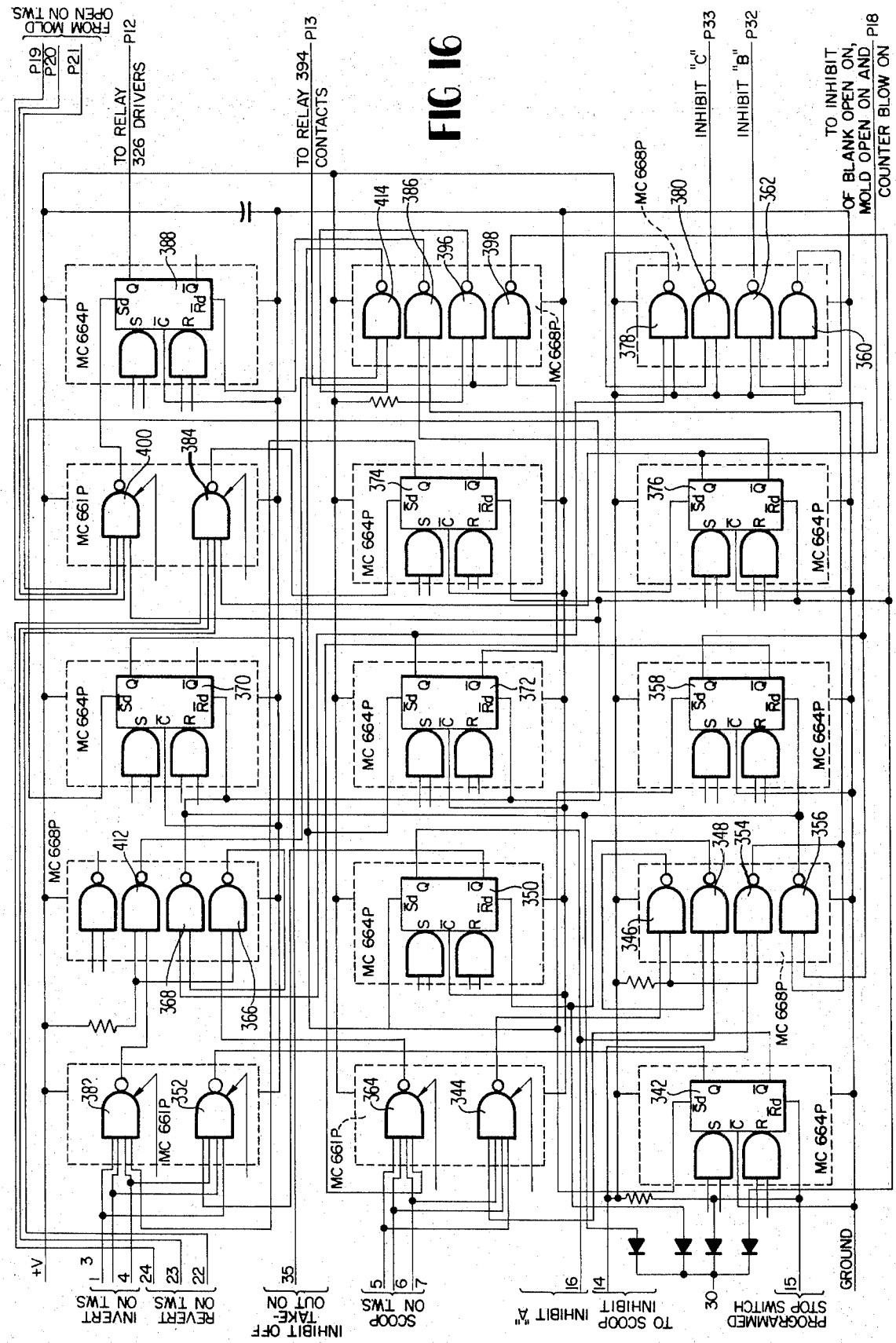

One of the more important circuits in the individual unit circuitry shown in block diagram form in FIG. 4 is the stop-start control circuitry 132, the details of which are shown in FIG. 16. This board both starts and stops the machine in a programmed mode.

Upon initiation of a programmed stop, the Rd input to flip-flop 342 is pulled to ground level, whereupon the Q output of flip-flop 342 goes low, inhibiting the scoop ON function. The $\bar{Q}$ output of flip-flop 342 goes high, removing an an inhibit to gate 344, the other three inputs to which are from the scoop ON thumbwheel switch. At this point in the cycle, the output of gate 344 goes low, and the output of gate 346 thus goes high; the output of gate 348 goes low, switching flip-flop 350. The Q output of flip-flop 350 goes low, resulting in a condition which may be termed "inhibit A," including the functions blank closed on thimble on, funnel on, plunger on, baffle on, crack blank on and settle blow on.

One of the inputs to gate 348 is the Q output of flip-flop 350; accordingly, as the latter switches, the output of gate 348 goes high. The $\bar{Q}$ output of flip-flop 350 is the inhibit for gate 352, and when flip-flop 350 switches, this output goes high, and the inhibit to gate 352 is removed. The other inputs to gate 352 are from the invert on the thumbwheel switch. At this point in the cycle, the output of gate 352 goes low, and the output of gate 354 goes high, rendering the output of gate 356 low and switching flip-flop 358. The Q output of flip-flop 358 is now low, and the output of gate 360 is high, resulting in a low output from gate 362 and creating "inhibit B" including the funcitons neckring off, blowhead on, revert on, final blow on, mold close on, takeout in on and puff air on.

Gates 362 and 360 serve as drivers for flip-flop 358, the $\bar{Q}$ output of which is now high, removing the inhibit to gate 364. The remaining inputs to gate 364 are the scoop on thumbwheel switch. Accordingly, on the second scoop on signal in the cycle, gate 364 output goes low, gate 366 output goes high and gate 368 output goes low, resulting in the switching of flip-flops 370, 372, 374 and 376. When the Q output of flip-flop 372 goes low, the output of gate 368 again goes high, and the Q outputs of the four flip-flops will now be low. Flip-flop 370 inhibits the take-out out on, and the condition of flip-flop 372, gate 378 and gate 380 combine to create "inhibit C," including invert on, bottom plate up on and bottom plate down on. Flip-flop 376 inhibits the blank open on, the mold open on and the counter blow on, while flip-flop 374 inhibits gate 382, which is used during the start cycle. Flip-flop 376 inhibits gate 384, employed during the start cycle.

On the next subsequent invert on signal, the output of gate 352 goes low and that of gate 354 goes high. The output of gate 386 can now go low, since one input to the gate is the $\bar{Q}$ output from flip-flop 276. When the output of gate 386 thus goes low, the Q output of flip-flop 388 goes low, constituting the signal to transistors 390 and 392 on the voltage regulator board (FIG. 7), relay 326 (FIG. 13) drops out, removing the power to the Triac circuits of the function control cards. The machine section is now safe, since none of the valves can be actuated.

Upon initiating the programmed start by closing start switch 328 (FIG. 13), relay 394 (FIGS. 7 and 13) is pulled in, rendering pins 10 and 12 of integrated circuit 386 low, resulting in the outputs of gate 396 and 398 going high. With the output of gate 398 high, the reset to flip-flops 370, 372, 374 and 376 is removed, as is the inhibit to gate 400. The other inputs to this latter gate are the mold open thumbwheel switch, and on the first mold open signal after the start button is pressed, the output of gate 400 goes low, setting flip-flops 370, 376 and 388. When flip-flop 370 switches, the inhibit to the take-out out on is removed. When flip-flop 376 switched, the inhibit is removed to the blank open on, the mold open on and the counter blow on. Similarly, when flip-flop 388 switches, relay 326 (FIG. 13) closes, and power is applied to all the Triacs on the function control cards. When transistors 390 and 392 (FIG. 7) associated with relay 326 saturate, all the function offs are turned off by the RC circuit in FIG. 7 comprising resistors 402 and 404 and capacitors 406, 408 and 410.

When flip-flop 376 switches, the inhibit to gate 384 is also removed. The remaining inputs to this gate are from the revert on thumbwheel switch, and upon the occurrence of the revert signal (following the mold open signal), the output of gate 384 will go low. Flip-flop 374 will now switch, and the inhibit to gate 382 is removed. The other inputs to this latter gate are the invert on thumbwheel switch outputs. Should the start botton switch 328 be opened before this invert signal, the output of gate 398 will go low and reset flip-flops 370, 374, and 376. Flip-flops 342, 350, 358 and 372 have not been switched as yet from their stop position, and flip-flop 388 will switch to the stop position on this invert signal, as a safety feature. Thus, the start button must be held for the full extent of the start cycle, or the machine section will not start, preventing an accidental actuation of the start button from initiating a true start. In a real start, where the start button has not been released on the invert on signal, the output of gate 382 goes low, the output of gate 412 goes high and the output of gate 414 goes low, setting flip-flops 342, 350, 358 and 372, and all the inhibits are thus removed.

An additional function related to the operation of the individual section machine, a function which forms an integral part of the overall operation thereof, is the stacker, by means of which ware proceeding down the conveyor from the several sections of the machine are arranged in a desired orderly manner for passing through the lehr. That is to say, some means must be provided to place the ware in sequential rows, each row including a predetermined number of bottles, jars or other ware being produced by the machine, for orderly passage through the lehr in order to assure proper treatment of the ware in the lehr, as well as to assure efficient use of the lehr. The means for accomplishing this desired marshalling of the ware on the conveyor usually comprises an apparatus referred to as a stacker. Stacker mechanisms are well known in the art, and no detailed reference is made thereto here, except as to the fact that means are included to provide the desired number of ware in each of a plurality of rows across the conveyor as the latter approaches the lehr, downstream of the individual section machine. It is known to utilize stacker mechanisms which are driven and controlled by valve action, more specifically solenoid hydraulic valve action, and it is to the means of controlling such solenoid-operated hydraulic valves that the presently described portion of the instant invention is directed.

Figure 17:
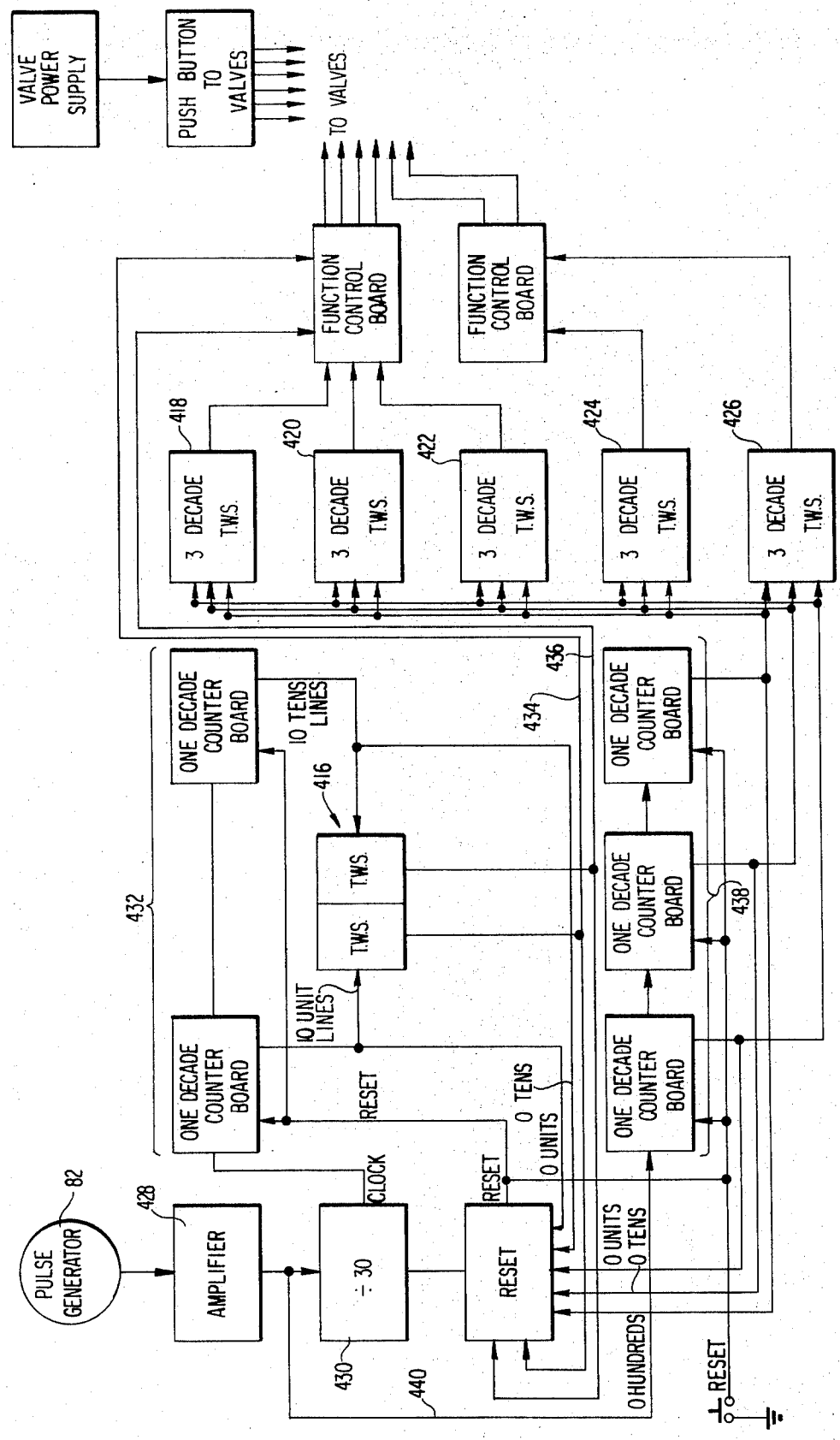
FIG. 17 is a block diagram of a preferred embodiment of the stacker controller circuitry of the present invention.

The preferred embodiment of the stacker controller means of the present invention is shown in block diagram form in FIG. 17, and as may be seen therein, the six stacker controller functions (3 "on" and 3 "off") of the preferred emobidiment are operated in accordance with the settings of six thumbwheel switches. One of these switches is a two-decade switch, as indicated at 416, and the other five are three-decade switches, shown at 418, 420, 422, 424 and 426 in FIG. 17. Two-decade switch 416 is set at a two-digit number equaling the number of ware articles in each row passing through the lehr.

Referring to the circuitry of FIG. 17 in somewhat greater detail, the signal from pulse generator 82 (previously shown in FIG. 3) is first amplified in amplifier 428 and then divided by thirty in divider 430. The output of divider 430 thus represents individual ware leaving the machine, since a six-section machine running dual gob makes two bottles or other ware every 60° of rotation, and in the preferred embodiment being described, each thirty degrees represents a single bottle.

The output of divider 430 constitutes a clock signal for a two-decade counter 432, the output of which, in turn, is applied to the two-decade thumbwheel switch 416. The setting on this switch thus represents the number of bottles or other ware, and the output thereof is utilized to activate the first function of the stacker, via conductors 434 and 436.

The stacker control of FIG. 17 also includes a three-decade counter 438, the clock to which is the output from the pulse generator amplifier 428, supplied by line 440. The three-decade counter 438 thus counts degrees of rotation of the individual section machine, and the five three-decade switches 418 through 426 are connected to counter 438 to drive the remaining five functions of the stacker mechanism.

If it be assumed that it is desired to have the ware pass through the lehr 12 abreast, the two-decade thumbwheel switch 416 would be set to the number "12." When the two-decade counter 432 counts to that number, the output of thumbwheel switch 416 triggers a function control circuit to turn on a respective valve in the stacker mechanism. At the same time, the output of thumbwheel switch 416 resets both the two-decade counter 432 and the three-decade counter 438.

Figure 18:
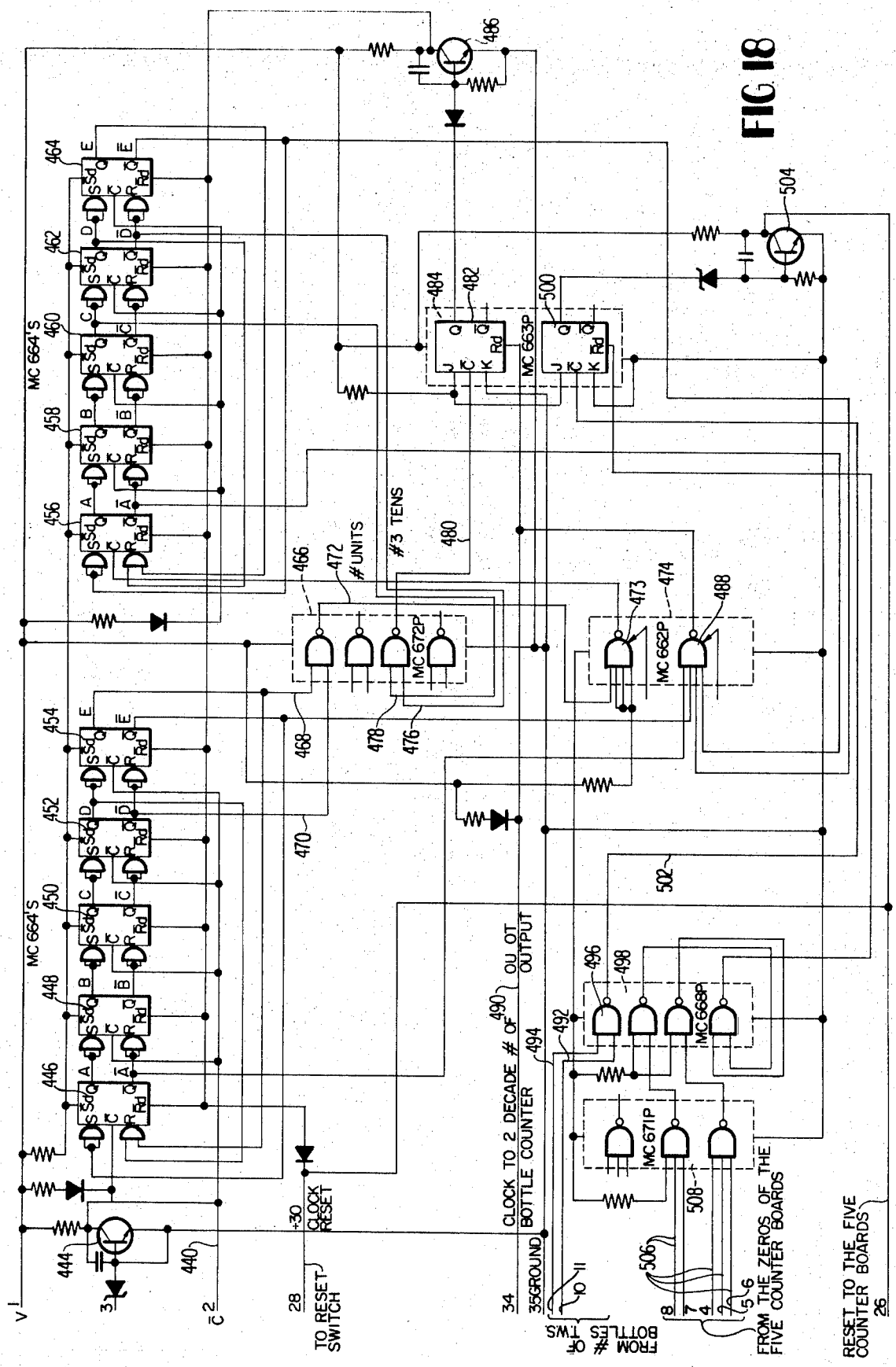
FIG. 18 is a schematic diagram of the primary circuitry of the stacker controller shown in FIG. 17.

FIG. 18 constitutes the circuitry of a circuit board which includes amplifier 428, divider 430 and reset circuit 442 of FIG. 17, and as such, this circuitry generates the clock signal for the two-decade counter 432 and gates all of the resets simultaneously to ensure proper operation.

The signal from pulse generator 82 is amplified by transistor 444 and passed to integrated circuit 446, the first stage of a two-decade counter comprising integrated circuits 446 through 464 and used to generate the divide-by-thirty signal. The output of transistor 444 also is applied by line 440 to the three-decade counter 438 of FIG. 17.

The number 9 units are decoded by a gate of integrated circuit 466, the inputs to which are at lines 468 and 470, with the output at line 472. Upon inversion by a gate 473 of integrated circuit 474, this signal becomes the clock to the second decade of the two-decade counter.

The number 3 tens are gated in integrated circuit 462 at 476 and 478, and out at 480 as a clock to flip-flop 482 of integrated circuit 484. When flip-flop 482 is thus clocked, the Q output goes high, saturating transistor 486, resetting both decades. This clocking of flip-flop 482 signifies the attainment of a count of 30.

The zero tens output and the zero units are decoded by the remaining gate 488 of integrated circuit 474, resetting the flip-flop 482, this reset signal also constituting the clock to the two-decade counter 432, via line 490. The counter comprising integrated circuits 446 through 464 thus counts up to 30, and is then reset to zero with line 490 going low for one clock pulse, putting a one count into the the two-decade counter 432.

When two-decade counter 432 reaches the number of the setting on thumbwheel switch 416, lines 492 and 494 are connected thereto go high. As a result, the output of gate 496 of integrated circuit 498 goes low, clocking the remaining flip-flop 500 of integrated circuit 484, via line 502. The Q output of flip-flop 500 goes high, saturating transistor 504 and resetting all five decades of the counters. At this point, lines 506 go high, and by way of the several gates of integrated circuits 508 and 498, reset flip-flop 500.

A further function related to the operation of the individual section machine and forming an integral part of such machine as a whole is the ware reject system, by means of which ware produced by the machine may be rejected from the output on the conveyor, usually prior to entry into the lehr. The rejection of individual ware may be desired in order to dispose of bottles or the like known to have flaws therein, or the rejection of ware may be desired to delete a selected number of ware produced by the machine immediately subsequent to a swabbing of the molds.

Means for effecting rejection of ware on a conveyor are well known in the art, and no detailed description is necessary at this point. Suffice it to say that the preferred embodiment of the automatic control system of the present invention is adapted to govern the operation of any reject means of the solenoid-operated hydraulic valve type, wherein an electrical control signal applied to a solenoid causes operation of the associated hydraulic valve and the reject mechanism connected thereto. Thus, an electrical signal may be employed to cause the reject mechanism to push selected ware off the conveyor, ejecting them from the production line proceeding toward the lehr.

The reject system of the present invention has the ability to automatically effect rejection of a desired number of ware from all or selected sections of the machine, and with great accuracy. That is to say, the reject system of the present invention may be adjusted to effect, upon actuation thereof, the rejection of one or more of the ware next produced by any or all of the several sections of the machine.

Figure 19:
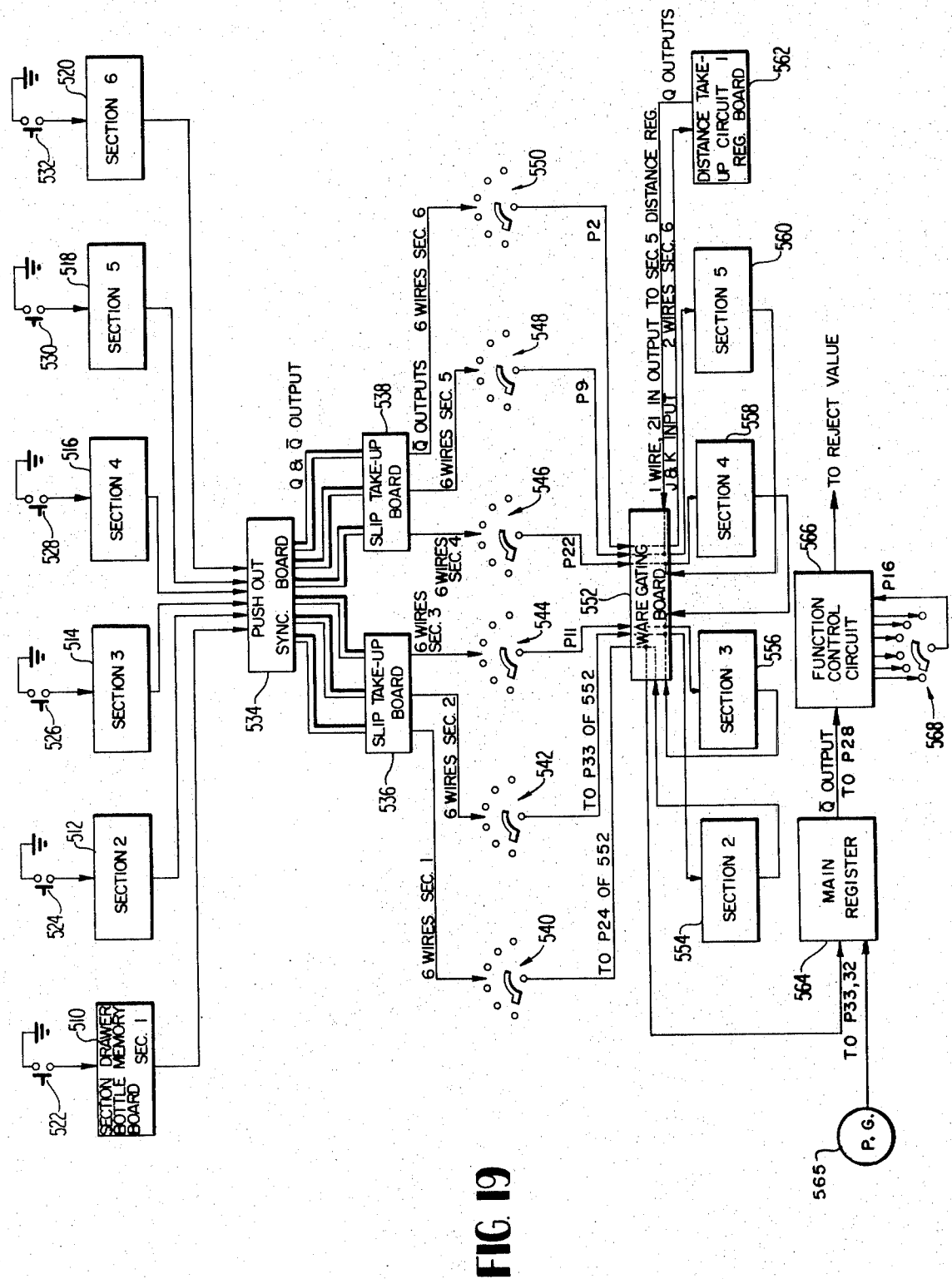
FIG. 19 is a block diagram of a preferred embodiment of the ware rejection system of the present invention.

FIG. 19 illustrates in block diagram form the circuitry of the ware reject system of the present invention. A plurality of reject memory boards 510 through 520, one for each section of the six-section machine, are each connected to a respective push-button switch 522 through 532, such switches preferably being positioned for easy access to a machine operator for initiating a desired reject. The outputs of the respective memory boards 510 through 520 are passed through a push-out synchronizing circuit 534 to two slip-takeup circuits 536 and 538, as will be further described. Each slip-takeup circuit has three outputs, each of which is a six-conductor cable leading to a respective one of six rotary switches 540 through 550, the respective outputs of which are applied to a ware-gating circuit 552. This latter circuit is interconnected with five distance-takeup registers 554 through 562, as shown, as well as with a main shift register 564. A function control circuit 566, with related switching means 568, provides an output signal which drives the solenoid of a reject valve to effect ejection of the ware selected for rejection.

In a description of the operation of the reject system as shown in FIG. 19, it is appropriate to first point out that the interest of the machine operator, when contemplating the rejection of ware, is in the ware coming out of the blank mold. The controls available to the operator include, for each section of the machine, a rotary switch for selecting a number of ware articles to be rejected and a pushbutton for initiating such rejection. Further, one instance in which the operator might well wish to effect rejection of a number of bottles or other ware being produced by the machine occurs when the operator swabs the inner or working surfaces of the molds with a lubricating dope. As is known to those familiar with this art, the lubrication of the molds often results in the production of imperfect ware for a few cycles of the machine operation subsequent to swabbing, due in part to the heat-insulating properties of the lubricant. Accordingly, the operator may wish to reject the next four, say, articles out of a blank mold after swabbing. In accordance with the present invention, the operator may thus set a rotary switch for each section at the number "four" and then press the reject push-button for each section swabbed. As a result, the next article out of the blank mold, as well as the three following it, is automatically followed through the machine and down the conveyor to the position of the reject mechanism, at which time the latter is automatically operated to eject each of the four selected articles.

In effecting this automatic operation, the push-out signal from the overall machine control system is employed as an input, by way of push-out synchronizing circuit 534, to shift register 564, which keeps track of the position of the ware as they move along the conveyor. The clock to this register is from a pulse generator 565 which provides clock pulses each representative of one inch of travel on the conveyor.

Further, since the ware emerging from each section of the machine upon push-out operation tend to slip with respect to the conveyor until they accelerate to belt speed, means are provided in the form of slip take-up circuits 536 and 538 to allow for the slippage. Each of the six slip take-up registers (three in each of slip take-up circuits 536 and 538) is controlled by a rotary switch which may be set to account for different belt speeds and different size ware.

Main shift register 564 represents the distance between section one of the machine and the reject gate, down the conveyor. Since the ware from five of the sections will travel respective greater distances to the reject mechanism, the five distance take-up registers 554 through 562 are provided, each affording a count apropos of the distance from its respective section to the reject gate. For example, the push-out signal from the sixth section of the machine is applied to the section six take-up register 562 and then clocked through the section five take-up register 560, and so on through registers 558, 556 and 554 and into main register 564. Ware gating circuit 552 serves to sort out the several signals so that they enter the take-up registers in proper sequence.

Signals in main register 564 are clocked therethrough and into function control circuit 566, as conditioned by rotary switch 568 to control the sixth-stage register of circuit 566 to allow for any misalignment of ware on the conveyor. The output of function control circuit 566 is applied to the reject mechanism, whereby hydraulic pressure may move a reject arm through a cycle.

Figure 20:
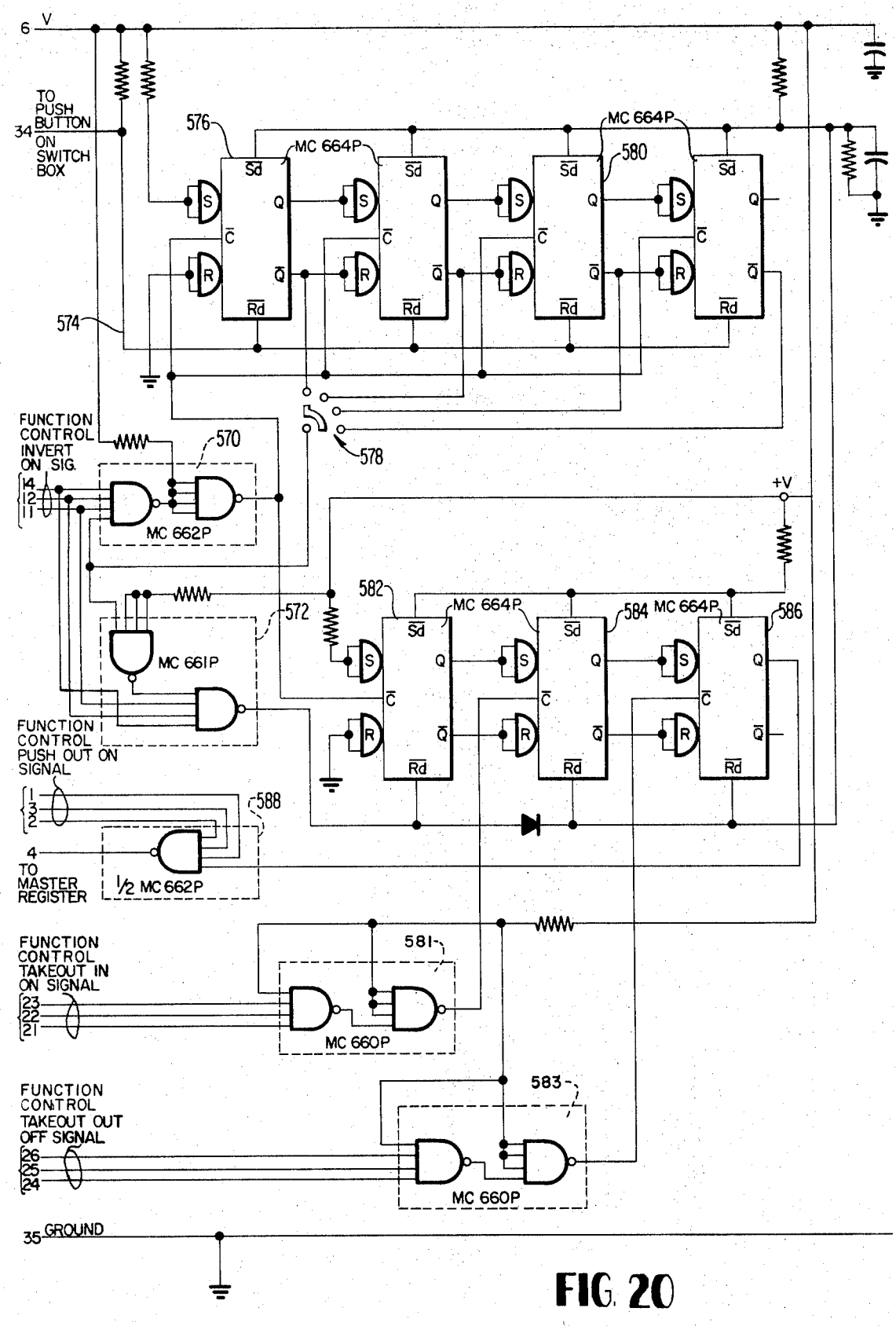
FIGS. 20 through 25 are schematic diagrams of the several component circuits shown in block diagram form in FIG. 19.

FIG. 20 shows the circuitry of each of the reject memory boards 510 through 520 of FIG. 19. The function of each of these memory circuits 510 through 520 is to keep track of a specific ware that is to be rejected as it leaves the blank mold in the associated machine section until it is placed on the conveyor, at which time the respective memory board provides an output signal which constitutes an input to appropriate circuitry in the slip take-up circuits 538 and 536.

Synchronization of the circuitry of FIG. 20 with the machine is achieved by the use of the invert on signal from the overall circuitry as an input to integrated circuits 570 and 572. The input from the operator's pushbutton is applied by way of line 574 to integrated circuit 576, constituting a reset signal to this shift register circuitry, the clock to which is the machine invert signal passing through the gates of integrated circuit 570. Rotary switch 578 is connected to the outputs of the upper register, and if it be assumed that the switch is set to the $\overline{Q}$ output of integrated circuit 580, upon operation of the pushbutton and reset of the upper shift register, all the $\overline{Q}$ terminals go high. It will thus take three invert signals before the $\overline{Q}$ output of integrated circuit 580 goes low.

The first invert signal passes through integrated circuit 570, clocking the register and integrated circuit 580, thus setting the inputs to integrated circuit 584. This latter circuit is clocked by the next takeout on signal which sets the inputs to integrated circuit 586, which is clocked by the takeout off signal. The Q output of integrated circuit 586 goes high, setting the gate of integrated circuit 588, which allows the push-out signal to pass. This sequence repeats three times, allowing three push-out signals to be placed in the main register 564, in FIG. 19. The third invert signal will cause the $\overline{Q}$ output of integrated circuit 580 to go low, making one input to the gate of integrated circuit 572 high, and on the next invert signal integrated circuit 582 will be reset. This will remove the inputs to integrated circuit 584, and no further push-out signals will pass integrated circuit 588. Thus, three push-out signals are supplied to main register 564 to represent the three bottles to be rejected (or, if dual gob, the six bottles). The integrated circuits 581 and 583 are provided for gating integrated circuits 584 and 586, respectively.

Figure 21:
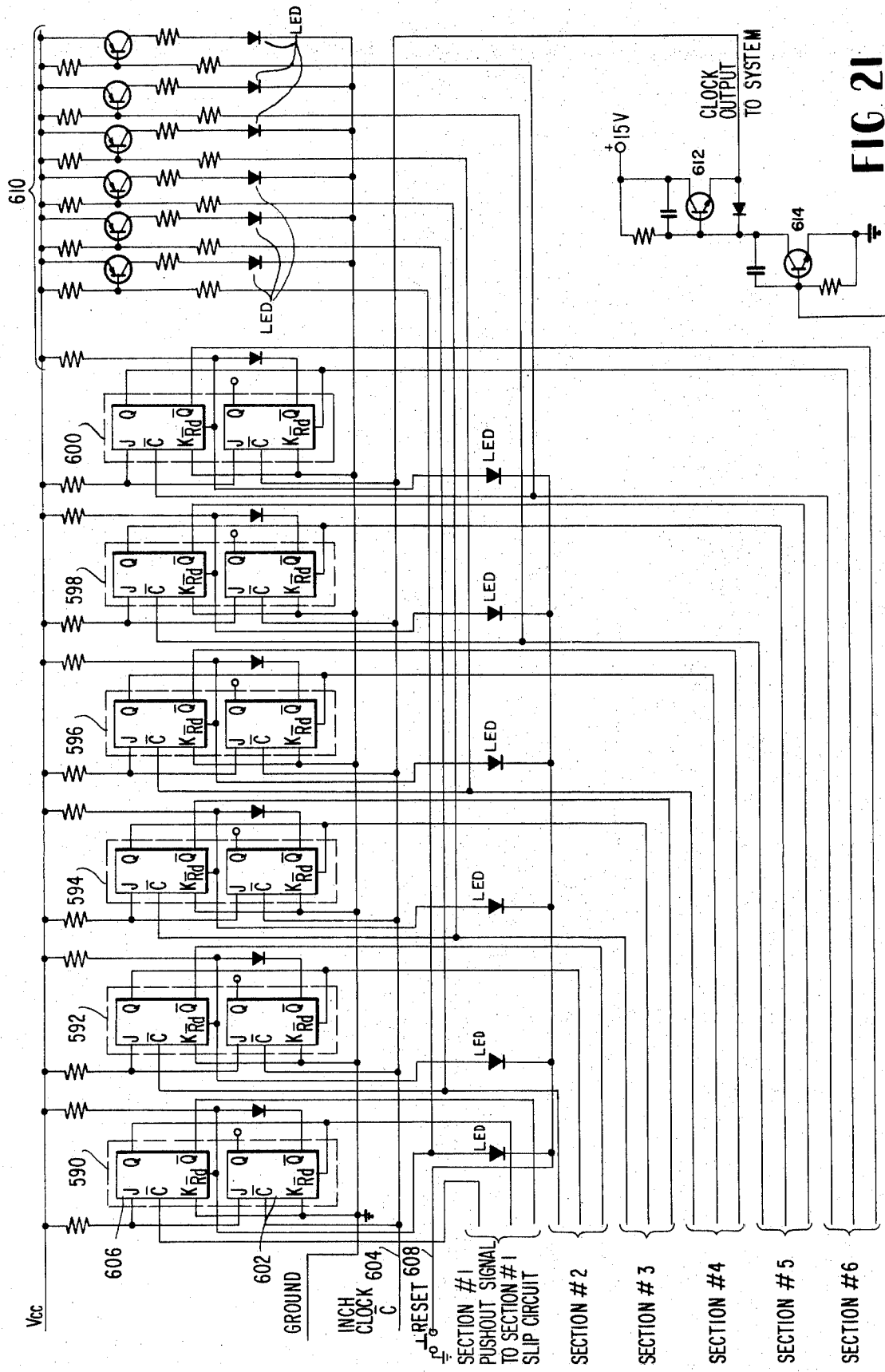

FIG. 21 shows the circuitry of the push-out synchronizing circuit 534 of FIG. 19, including six integrated circuits 590 through 600, each of which is a dual JF flip-flop. The input to flip-flop 602 is the inch clock signal, by way of line 604, whereas the input to the other flip-flop 606 of integrated circuit 590 is the push-out signal from a section, by way of line 608. Flip-flop 602 cannot change state until flip-flop 606 is switched, and the latter is clocked by the trailing edge of a push-out signal from a section. When this happens, the Q output of flip-flop 606 goes high, making the $\overline{Rd}$ input to flip-flop 602 high. The Q and $\overline{Q}$ outputs of flip-flop 606 are the inputs to the next stage of the system. After the $\overline{Rd}$ input to flip-flop 602 becomes high, it can be switched by the trailing edge of the next signal from the one-pulse-per-inch generator. When flip-flop 602 switches, it resets flip-flop 606, which in turn resets flip-flop 602. The push-out signal is now in synchronism with the inch clock.

The circuitry indicated generally at 610 comprises a plurality of transistors and light-emitting diodes, for use in trouble shooting. Transistors 612 and 614 comprise the clock amplifier. In view of the large number of shift register stages in the associated circuitry, all being run from the same clock, a power amplifier is employed for the 1-inch-pulse generator.

It is to be noted that various light-emitting diodes, designated LED, are connected throughout the circuit of FIG. 21. These types of diodes are provided for trouble shooting the circuit.

Figure 22:
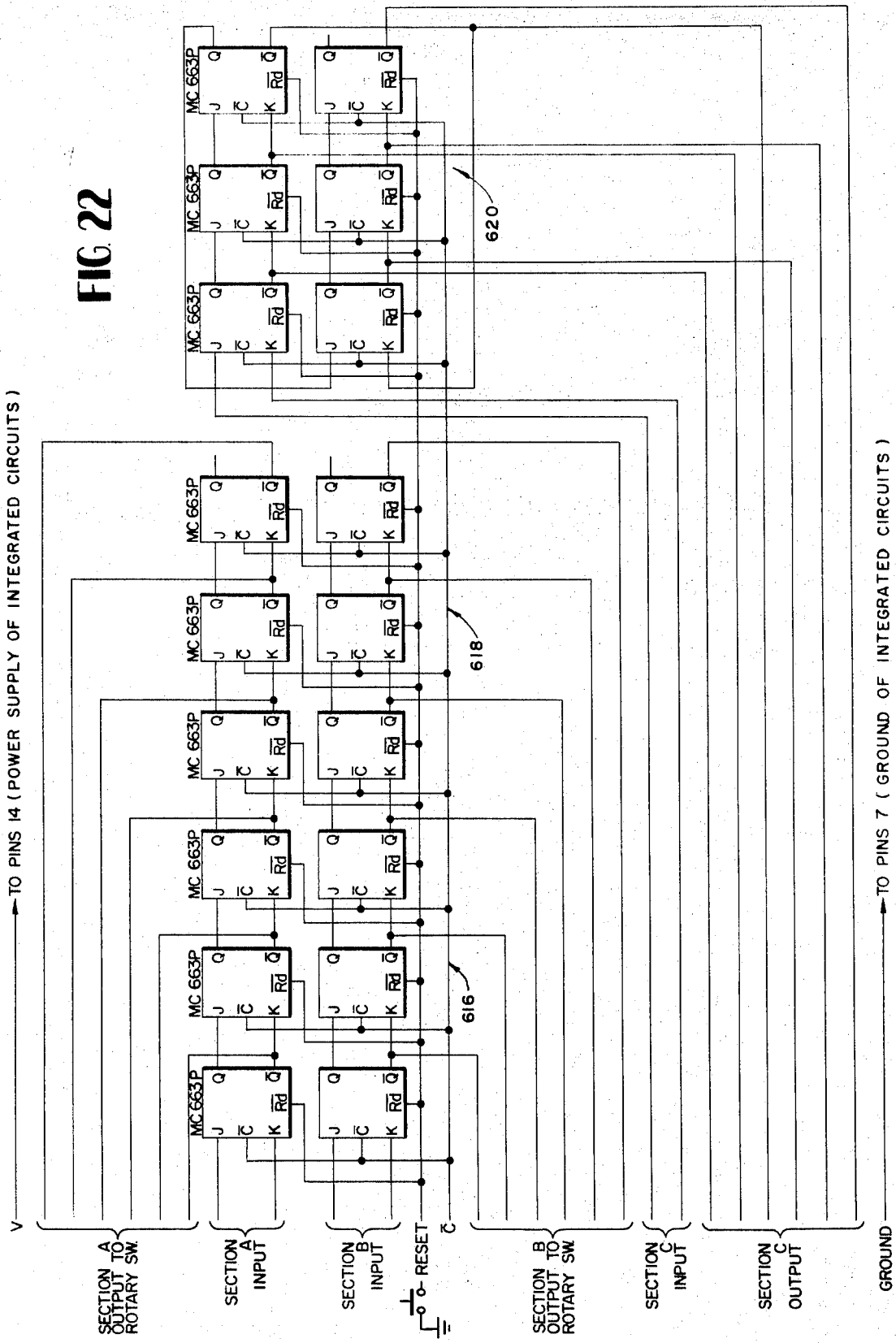

As may be seen in FIG. 22, the slip take-up circuits 536 and 538 each comprise three six-stage registers 616, 618, and 620. As is shown in FIG. 19, two such circuits are employed in the system.

Figure 23:
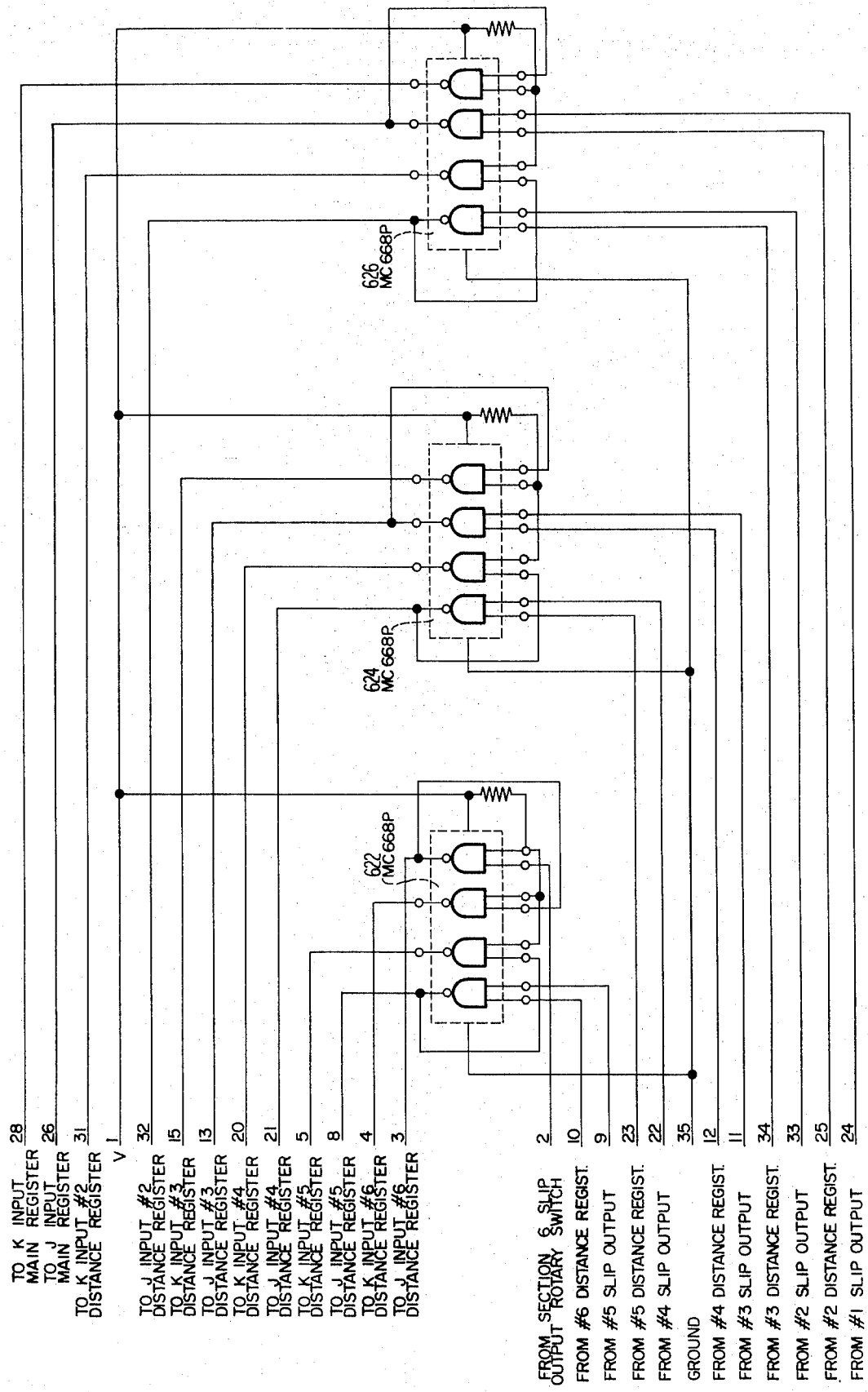

The ware gating circuit 552 of FIG. 19 is shown in detail in FIG. 23, comprising a series of gates in three integrated circuits 622, 624, and 626, these gates allowing the push-out signals to pass from the slip take-up circuitry to the distance take-up registers, as well as from one take-up register to another.

Figure 24:
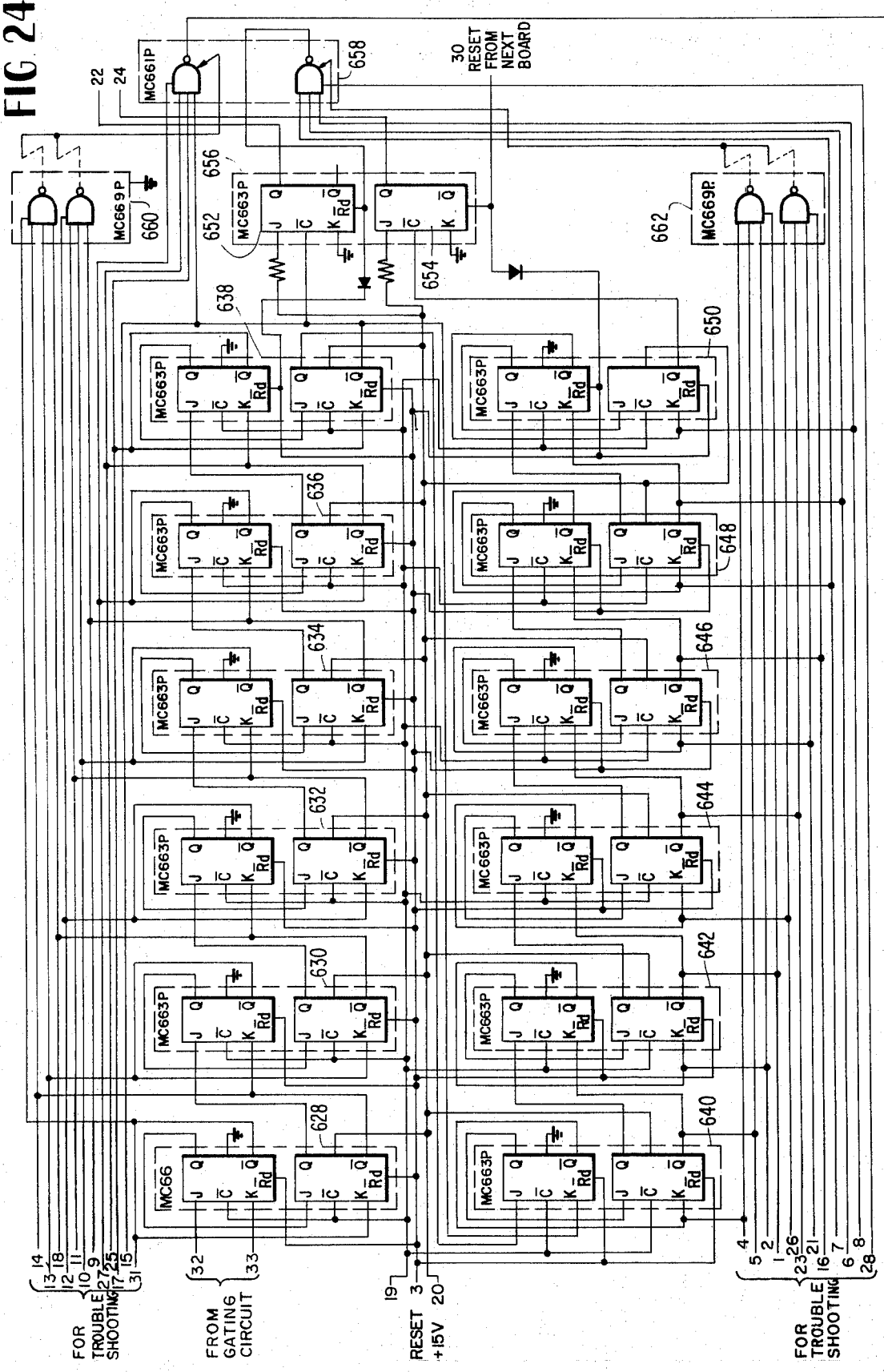

Main register 564 of FIG. 19 comprises a number of shift register boards apropos of the distance to be covered between the machine and reject gate. The detailed circuitry of each such shift register board is shown in FIG. 24, wherein it may be seen that each board contains 24 stages of shift register circuitry, representing 24 inches of conveyor belt travel. These 24 stages are provided by the 12 integrated circuits 628 through 650, as shown. Two extra flip-flops 652 and 654, constituting integrated circuit 656, are added for the one and two foot outputs. Integrated circuit 658 constitutes a dual gate for gating the reset to the register. When a signal is clocked into the register and reaches the twelfth stage, the one foot flip-flop also is clocked. When this same signal reaches the 24th stage, the 1 foot flip-flop is switched off and the 2 foot flip-flop is clocked on. If two signals are in the register, and the first one reaches the 24th stage while the second is between the 12th stage and the 24th, integrated circuit 658 serves to prevent the 12th stage being switched off. Integrated circuits 660 and 662 constitute gate expanders for integrated circuit 658.

Each of the distance take-up circuits 554 through 562 constitutes one shift register board of the type shown in FIG. 24.

Figure 25:
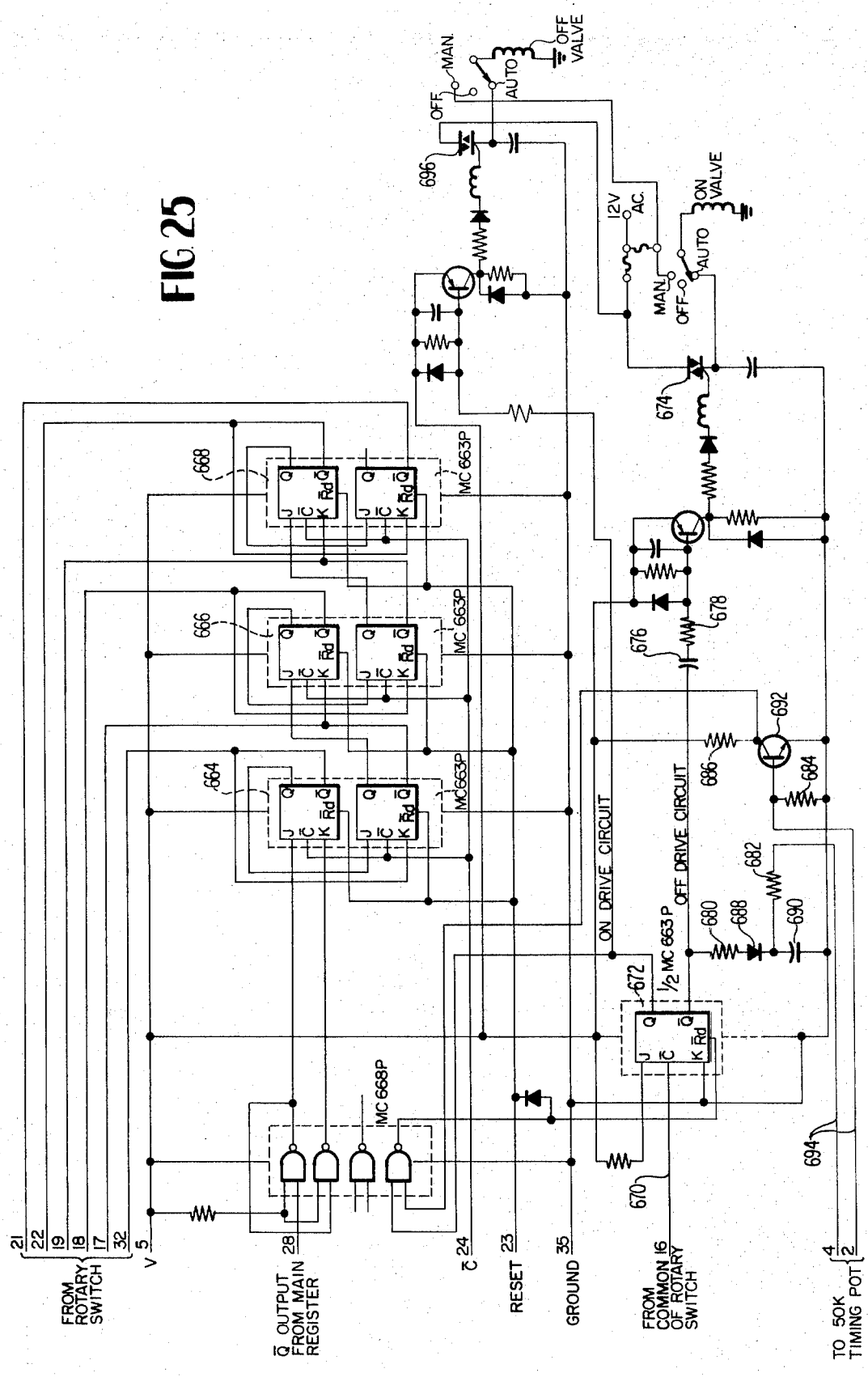

The circuitry of function control circuit 566 in FIG. 19 is shown in detail in FIG. 25. The operation of this circuit is similar to one of the section function control circuits originally referred to in FIG. 4, except for the fact that a six-stage register comprising integrated circuits 664, 666 and 668, is added. The output of the register foes through rotary switch 568 (FIG. 19), so any output may be selected. The common line of the switch, line 670, clocks the flip-flop of integrated circuit 672, activating Triac 674 through a timing circuit comprising capacitor 676 and resistor 678. The on valve is thus activated, and the reject gate deflects a ware article off the conveyor belt. Another timing circuit is included to vary the time that this gate stays on, such circuit including resistors 680, 682, 684 and 686, diode 688, capacitor 690, transistor 692 and an external timing potentiometer connected to line 694 to vary the timing. When the time expires, integrated circuit 672 is switched, and Triac 696 is activated, pulling the reject gate back in.

Figure 26:
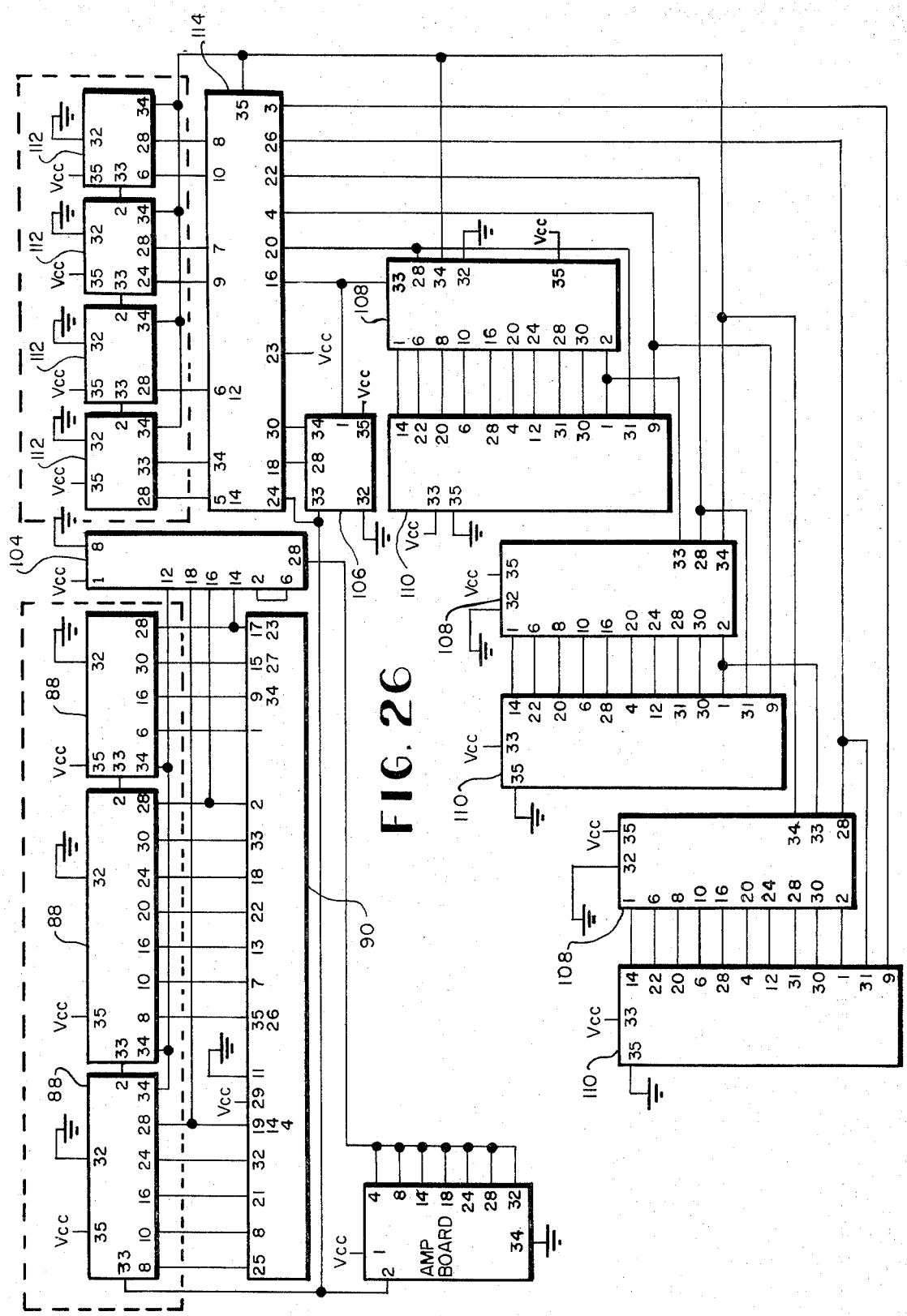
FIGS. 26 and 27 are wiring diagrams illustrating various pin connections of various components described herein.
Figure 27:
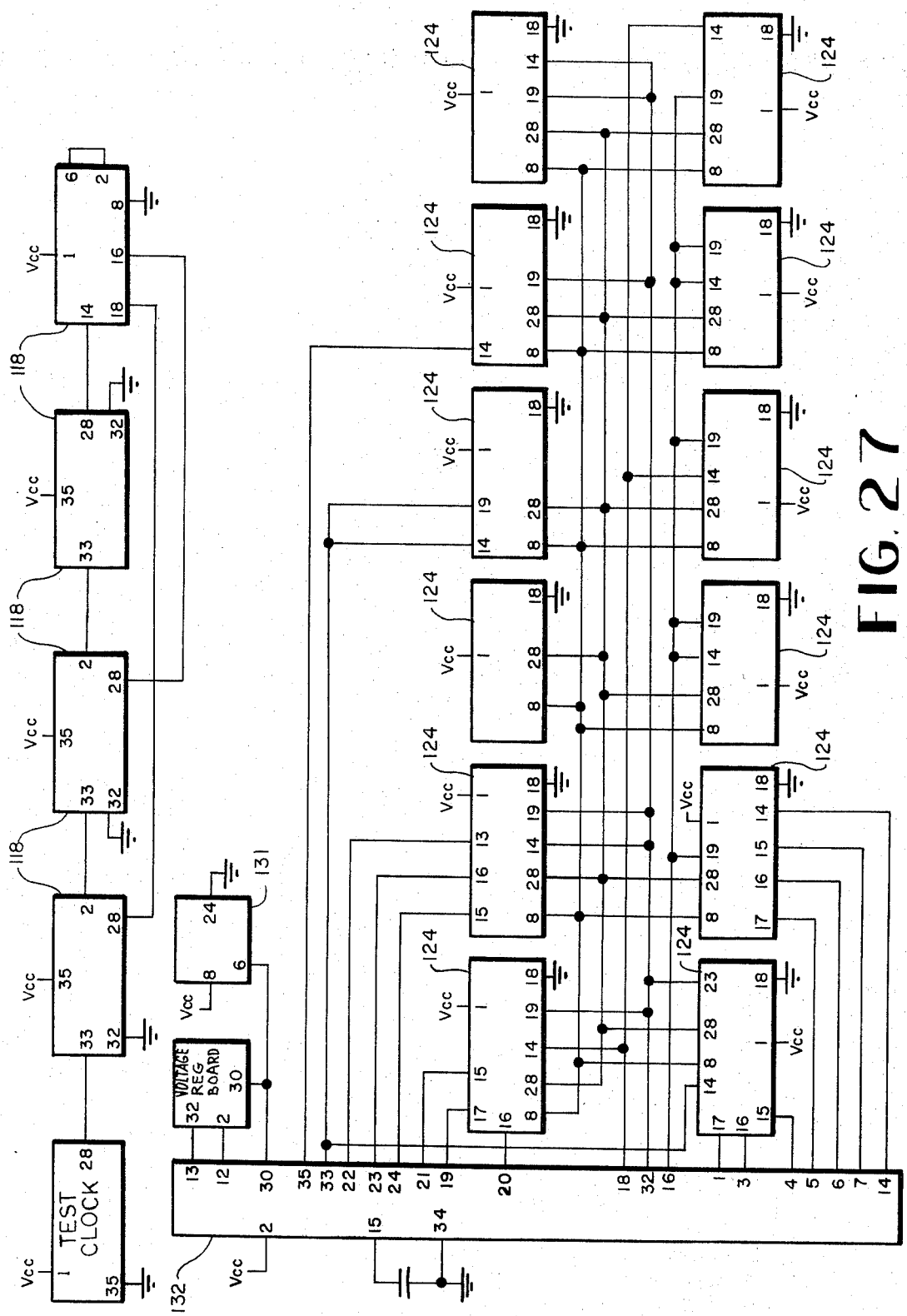

Turning now to FIGS. 26 and 27, which represent the master unit and one of the individual units, respectively, attention is directed to the manner in which various ones of the components, described hereinabove, are interconnected. As illustrated in these figures, the components are represented in block form with numbers designating pin connections located thereon. For example, in FIG. 26, the gating board 90 is s shown having pin 2 thereof connected to pin 28 of one of the counters 88 and also to pin 16 of the sync board 104. A further description of the various pin connections is not necessary since the wiring diagrams of FIGS. 26 and 27 are self-explanatory, reference being made thereto.

It is to be understood for purposes of clarity, that FIGS. 26 and 27 do not illustrate all of the pin terminals provided with the various components. For example, various ones of these components include unconnected pins which, while illustrated in detailed circuit figures, are not shown in FIGS. 26 and 27. In addition, the various pin connections which are described hereinabove, or in the detailed circuit figures, are also eliminated from FIGS. 26 and 27 for purposes of clarity. Further, the wiring diagrams of FIGS. 26 and 27 are illustrative of the various pin connections required for one section of the entire machine, the remaining sections being connected in the same manner, except where noted hereinabove, as would be obvious to one with ordinary skill in the art and in view of the foregoing.

The invention has been described above in considerable detail, and particularly with reference to its application to the specific embodiment given, as well as the particular form of electro-mechanical actuators described. However, it will be apparent to those skilled in the art that the invention is also applicable to electromechanical actuators of other than the sydraulic type referred to herein. Further, obvious variations in the other details shown in the specific embodiment may be made in achieving an automatic control system in accordance with the present invention. In addition, those components which are not shown in detail or which are not numbered or described are conventional components, a description, therefore, not being necessary. Hence, the invention is not to be considered as being limited to the particular details given, nor to the specific application to which reference has been made during the description of the control system disclosed, except insofar as may be required by the scope of the appended claims.

What is claimed is:

1. Automatic control means for a glassware forming machine having means for feeding gobs of molten glass at a uniform rate from a predetermined location and a plurality of sections each of which repetitively performs a sequence of steps in the formation of rigid glassware articles from gobs taken from said feeding means, comprising first electronic control means individual to each of such glassware forming sections including first counting means and first control means for automatically controlling the order and duration of the several steps performed by the respective forming sections, and second electronic control means responsive to the rate of gob feed and including second counting means and second control means connected with said first counting means of each of said first electronic control means for control of said first control means therein whereby said second electronic control means automatically controls the sequencing and operation of said first electronic control means in timed relationship with each other and relative to the rate of gob feed from the gob feeding means.

2. Automatic control means for a glassware forming machine in accordance with claim 1, wherein said second electronic control means common to all of said forming means includes means for providing a series of electrical pulses representative of the progressive movement of the main mechanical drive means for such machine, means for coupling said electrical pulses to said second counting means, and said second control means including means for selectively gating respective ones of such counted pulses to each of said first electronic control means to control the sequencing and operation thereof.

3. Automatic control means for a glassware forming machine in accordance with claim 2, and including means for providing a readout of the number of cycles of operation of such single gob feeding means.

4. Automatic control means for a glassware forming machine in accordance with claim 3, wherein said readout means includes electronic counter circuitry and a visual numerical display means.

5. Automatic control means for a glassware forming machine in accordance with claim 2, and including means for providing an electrical pulse at the completion of each cycle of operation of such machine as a whole.

6. Automatic control means for a glassware forming machine in accordance with claim 5, wherein said means for providing an electrical pulse at the completion of each machine cycle comprises an electrical pulse generator, and wherein said glassware forming machine includes a main drive shaft for driving said electrical pulse generator.

7. Automatic control means for a glassware forming machine in accordance with claim 5, wherein the output of said means providing an electrical pulse at the completion of each machine cycle is connected to said second counting means to provide a reset signal therefor.

8. Automatic control means for a glassware forming machine in accordance with claim 5, wherein the output of said means providing an electrical pulse at the completion of each machine cycle is connected to said selective gating means as one of the input signals thereto.

9. Automatic control means for a glassware forming machine in accordance with claim 1, and including means for resetting said second counting means under the control of a reset signal derived from said second electronic control means.

10. Automatic control means for a glassware forming machine in accordance with claim 1, wherein lack of said first electronic control means includes means for interrupting the normal operation of said respective forming means after a predetermined sequence of steps in the operation thereof, whereby a programmed stop is effected.

11. Automatic control means for a glassware forming machine in accordance with claim 10, and including means for initiating the normal operation of such respective forming means after a predetermined sequence of steps in the operation thereof, whereby a programmed start is effected.

12. Automatic control means for a glassware forming machine in accordance with claim 10, and including means for immediately interrupting the normal operation of such respective forming means, whereby an emergency stop is effected.

13. Automatic control means for a glassware forming machine in accordance with claim 1, wherein said glassware forming machine includes ware stacking means and wherein said automatic control means includes means for counting electrical pulses derived from said second electronic control means, and
means for selectively connecting respective ones of such counted pulses in timed relationship to said ware stacking means, whereby a desired stacking of ware on an associated conveyor is effected.

14. Automatic control means for a glassware forming machine in accordance with claim 1, wherein said glassware forming machine includes a blank mold and has a conveyor and reject mechanism associated therewith, and wherein said automatic control means includes means under the control of said first electronic control means for providing a series of electrical pulses representative of the progressive movement of a ware article from said blank mold of such machine to the time of push-out onto said associated conveyor,
means for providing a series of electrical pulses representative of the progressive movement of such ware article from the time of push-out onto such associated conveyor to the time of arrival of such ware article at said associated reject mechanism, and
means for supplying an electrical actuating signal for such associated reject mechanism at the expiration of such second period of time.

15. A glassware forming machine for forming rigid glassware articles from molten glass, comprising
means for feeding successive gobs of molten glass at a uniform rate,
a plurality of glassware forming means each constituting a section of such machine for repetitively performing a sequence of steps in the formation of rigid glassware articles from gobs taken from said feeding means,
first electronic control means individual to each of said glassware forming means including first counting means and first control means for automatically controlling the order and duration of the several steps performed by the respective forming means, and
second electronic control means responsive to the rate of gob feed and including second counting means and second control means connected with said first counting means of each of said first electronic control means for control of said first control means therein whereby said second electronic control means automatically controls the sequencing and operation of said first electronic control means in timed relationship with each other and relative to the rate of gob feed from the gob feeding means.

16. A glassware forming machine for forming rigid glassware articles from molten glass in accordance with claim 15, wherein said second electronic control means common to all of said forming means includes
means for providing a series of electrical pulses representative of the progressive movement of the main mechanical drive means for said machine,
means for coupling said electrical pulses to said second counting means, and
said second control means including means for selectively gating respective ones of such counted pulses to each of said first electronic control means to control the sequencing and operation thereof.

17. A glassware forming machine for forming rigid glassware articles from molten glass in accordance with claim 16, and including means for providing a readout of the number of cycles of operation of said gob feeding means.

18. A glassware forming machine for forming rigid glassware articles from molten glass in accordance with claim 17, wherein said readout means includes electronic counter circuitry and a visual numerical display means.

19. A glassware forming machine for forming rigid glassware articles from molten glass in accordance with claim 16, and including means for providing an electrical pulse at the completion of each complete cycle of operation of said machine as a whole.

20. A glassware forming machine for forming rigid glassware articles from molten glass in accordance wiith claim 19, wherein said means for providing an electrical pulse at the completion of each machine cycle comprises an electrical pulse generator driven by the main drive shaft of said machine.

21. A glassware forming machine for forming rigid glassware articles from molten glass in accordance with claim 19, wherein the output of said means providing an electrical pulse at the completion of each machine cycle is connected to said second counting means to provide a reset signal therefor.

22. A glassware forming machine for forming rigid glassware articles from molten glass in accordance with claim 19, wherein the output of said means providing an electrical pulse at the completion of each machine cycle is connected to said selective gating means as one of the input signals thereto.

23. A glassware forming machine for forming rigid glassware articles from molten glass in accordance with claim 15, and including means for resetting said second counting means under the control of a reset signal derived from said second electronic control means.

24. A glassware forming machine for forming rigid glassware articles from molten glass in accordance with claim 15, wherein lack of said first electronic control means includes means for interrupting the normal operation of said respective forming means after a predetermined sequence of steps in the operation thereof, whereby a programmed stop is effected.

25. A glassware forming machine for forming rigid glassware articles from molten glass in accordance with claim 24, and including means for initiating the normal operation of said respective forming means after a predetermined sequence of steps in the operation thereof, whereby a programmed start is effected.

26. A glassware forming machine for forming rigid glassware articles from molten glass in accordance with claim 24, and including means for immediately interrupting the normal operation of said respective forming means, whereby an emergency stop is effected.

27. A glassware forming machine for forming rigid glassware articles from molten glass in accordance with claim 15, including means for counting electrical pulses derived from said second electronic control means, and
means for selectively connecting respective ones of such counted pulses in timed relationship to ware stacking means forming a part of said machine, whereby a desired stacking of ware on an associated conveyor is effected.

28. A glassware forming machine for forming rigid glassware articles from molten glass in accordance with claim 15, including means under the control of said first electronic control means for providing a series of electrical pulses representative of the progressive movement of a ware article from a blank mold of said machine to the time of push-out onto an associated conveyor,
means for providing a series of electrical pulses representaive of the progressive movement of such ware article from the time of push-out onto such associated conveyor to the time of arrival of such ware article at an associated reject mechanism, and
means for supplying an electrical actuating signal for such associated reject mechanism at the expiration of such second period of time.

29. Automatic control means for starting and stopping a glassware forming machine having a plurality of section means each of which has means for performing a sequence of steps in the formation of rigid glassware articles, said automatic control means comprising means for starting the normal operation of each of said forming section means by causing a predetermined sequence of steps in the operation thereof to be performed without interruption whereby a programmed start is effected and means for interrupting the normal operation of each of said forming section means, said interrupting means being effective only after said predetermined sequence of steps in the operation thereof have been performed, whereby a programmed stop is effected.

30. Automatic control means for starting and stopping a glassware forming machine in accordance with claim 29 and including means for immediately interrupting the normal operation of such respective forming means, whereby an emergency stop is effective.

* * * * *

UNITED STATES PATENT OFFICE
CERTIFICATE OF CORRECTION

Patent No. 3,762,907　　　　　　　　　　Dated　October 28, 1973

Inventor(s)　Richard M. Quinn et al.

It is certified that error appears in the above-identified patent and that said Letters Patent are hereby corrected as shown below:

Column 14, line 15, "106" should read -- 206 --.

Column 26, line 68, "lack" should read -- each --.

Column 28, line 59, "lack" should read -- each --.

Signed and Sealed this

*eighteenth* Day of *November 1975*

[SEAL]

*Attest:*

RUTH C. MASON
*Attesting Officer*

C. MARSHALL DANN
*Commissioner of Patents and Trademarks*